United States Patent
Croy et al.

(10) Patent No.: US 10,387,947 B2
(45) Date of Patent: Aug. 20, 2019

(54) LOCATION ASSIGNMENT SYSTEM AND METHOD

(71) Applicant: POINT INSIDE, INC., Bellevue, WA (US)

(72) Inventors: Jonathan Alan Croy, Seattlew, WA (US); Joshua Logan Marti, Bellevue, WA (US); Michael Moricz, Bellevue, WA (US); Mohandas Kannan, Bothell, WA (US)

(73) Assignee: Point Inside, Inc., Bellevue, WA (US)

( * ) Notice: Subject to any disclaimer, the term of this patent is extended or adjusted under 35 U.S.C. 154(b) by 225 days.

(21) Appl. No.: 15/702,595

(22) Filed: Sep. 12, 2017

(65) Prior Publication Data

US 2018/0005309 A1    Jan. 4, 2018

Related U.S. Application Data

(63) Continuation of application No. 14/680,963, filed on Apr. 7, 2015, which is a continuation-in-part of application No. 14/250,094, filed on Apr. 10, 2014.

(51) Int. Cl.
*G06Q 30/00* (2012.01)
*G06F 17/30* (2006.01)
*G06Q 30/06* (2012.01)

(52) U.S. Cl.
CPC ..... *G06Q 30/0639* (2013.01); *G06Q 30/0603* (2013.01)

(58) Field of Classification Search
CPC .................................................. G06Q 30/0639
See application file for complete search history.

(56) References Cited

U.S. PATENT DOCUMENTS 8,407,108 B2  3/2013  Foltz
8,923,893 B2  12/2014 Austin

OTHER PUBLICATIONS

Bachtelle, B. (Jun. 2014). How to create your micro market planogram. Automatic Merchandiser, 56, 14-16. Retrieved from http://search.proquest.com/docview/1614634607?accountid=14753.

*Primary Examiner* — Kathleen Palavecino

(57) ABSTRACT

A location assignment system and method assigns and stores a location to each item in a retail system product line, across one or more store venues, that otherwise do not include location information, e.g., is not included in planogram data. Specific rules and algorithms assign a location for each product by inferring a location of each product lacking location information from other items that do have a location, and assigning the location of a most popularly sold item in a weighted grouping of given attributes of the item. Thus, given a complete catalog of every product sold in a given retail store system (which often runs in the tens of thousands or even hundreds of thousands of individual products—up to 40% of more of which have no location information within a planogram), the location assignment system assigns a location to every product sold.

21 Claims, 11 Drawing Sheets

LOCATION ASSIGNMENT SYSTEM AND METHOD

The present application is a continuation-in-part of U.S. patent application Ser. No. 14/680,963 entitled "LOCATION ASSIGNMENT SYSTEM AND METHOD", filed Apr. 7, 2015; which in turn is a continuation-in-part of U.S. patent application Ser. No. 14/250,094 entitled "LOCATION ASSIGNMENT SYSTEM AND METHOD", the entirety of both of which are expressly incorporated herein by reference.

BACKGROUND OF THE INVENTION

1. Field of the Invention

The present disclosure relates to systems and methods of assigning or anticipating an actual shelf, section and store location, to an entire catalog of products available in a retail system on a regular basis, following and anticipating movement of the display location of items for presentation and display day to day, week to week, etc. throughout a retail network of stores.

2. Background of Related Art

A planogram (POG) is a well-known term in the retail industry referring to a visual plan which designates the placement of products on the shelves and merchandising display fixtures of a retail store. The planogram is a textual or visual representation(s) or diagram(s) usually created by an advertising/marketing/sales team. Usually, planograms take the form of a schematic diagram or drawing, but increasingly planograms are being managed digitally using photographic images on tablets and smart phones. In large retail store chains, planograms are used to create consistency between store locations, to provide proper shelf space allocation, to improve visual merchandizing appeal, and to create product pairing suggestions. There are also other systems that perform similar function to a planogram, i.e., which communicate where items should be placed/merchandised. For instance, "Guide", "Set Guide", "Sell Guide", "Adjacency" are all ways to associate multiple items into a group with a recommended method for curating the items on the sales floor. The ultimate goal of a planogram is to guide and focus in-store merchandising efforts which should then result in increased retail sales. Thus, planograms, or planograms indicate the planned placement of products within a store or venue. They can indicate where, and in what volume, items are to be placed.

Planograms provide specific guidelines to employees to keep on top of restocking and merchandizing efforts. However, being a guideline, determining the actual location of any given item, on any given day, within any given store of a large chain is a challenge, particularly given that the exact shelf or floor display locations of items may and do change daily. In fact, even the floor displays themselves may move from day to day, e.g., racks of clothing.

Moreover, in larger retail brands having a number of different stores, while the planogram serves as a guide, local discretion may be implemented in placement of any given item on any given day. Thus, determination of the actual locations of a mass number of retail items on any given day, particularly across many stores within a retail chain, isn't conventionally viable or even possible. Even in the largest retail chains which may have hundreds and sometimes thousands of physical brick-and-mortar store locations, while the planogram for any given day for each store in the chain can have a very similar layout, often local, customized merchandizing strategies are implemented to reflect regional preferences.

Planograms are generally distributed on a periodic basis, e.g., quarterly, with seasonal merchandise rotated into the product mix. Often a number of different planograms will be tested in different store locations to determine the best resulting product locations.

Store operators often have diagrams of stores, as well as information regarding the location of many products within the stores (e.g., a planogram). However, the information regarding the location of specific products within one or more of the stores is often incomplete or missing. Needless to say, locating a specific item in any given store is hampered by incomplete or missing product location information, for which no locating guidance can be provided.

Moreover, even when there is a planogram or planogram, certain types of retail items such as apparel items are more prone to be placed in specific locations within stores without exactly following the relevant detailed planogram or planogram. In this case planograms or planograms are often imprecise and inaccurate. For instance, while other types of merchandise such as hardware, household items, and groceries, are usually more properly allocated to specific shelves and even sections of shelves following the relevant planogram relatively closely, placement of individual items of apparel and such in many stores is often left to the discretion of local department and floor managers, rather than being scripted in advance according to the relevant planogram or planogram.

Both the employees of the retail stores and their customers need to know exactly where items are located so that they can be found and purchased (in the case of a shopper), or located by an employee to, e.g., hang a sign, restock, reface (organize and cleanup), etc.

A typical planogram covers planned locations of products along one aisle of a store, or sometimes a portion or segment of an aisle of a store. Some planograms wrap around the ends of an aisle.

Conventionally, planograms were first created by visual merchandizers for a single category of product. So, e.g., if you are in a grocery looking at a grocery isle, and there is 40 linear feet of shelf space of cereal products, the merchandizer has the responsibility of creating a profit on that space. Thus, the merchandizer of course wants to buy the correct products to sell at the right price to maximize the profit from that shelf space. If certain products grow and are highly successful, the merchandizer might expand the planogram to, e.g., 44 feet or 48 feet. If a product on that planogram is not successful or is not selling as much as the merchandizer thinks it should, then that planogram might lose some shelf space. Merchants are constantly competing with each other, vying for extra shelf space in a planogram, often being forced to accommodate neighboring/adjacent POG needs (e.g., a seasonal increase in the space for cough and cold items during winter).

However, even the best retailers don't planogram 100% of their products. For instance, some retailers planogram 60% of the products that they offer, while some of the most structured retailers may planogram up to 75-80% of the products that they offer. Nevertheless, this leaves at best a full 20% of product that is not assigned a location in a planogram, and as much as 40% or more. This, unfortunately, leaves much room for guessing the location of a large portion of products.

Moreover, retailer location-related data (particularly planograms) is rather unreliable. The location-related data sometimes is not ideally maintained, sometimes may be updated on the spot, and sometimes is not even created.

Accordingly, when providing direction to an employee restocking shelves, or to a customer looking for a particular item, or to an online fulfillment center who has a list of retail items within the retailers system to procure and ship, determination of the location of all items within a retailer's system (which can be hundreds of thousands of items) is important. All systems are only as efficient as their weakest link, and if the location of a significant percentage of items within a retailer's system are unknown, any operation that requires location of any number of items can fail. Thus, it is important for a retailer to create a database of the items within their retail catalog that includes a location for every item within that catalog.

SUMMARY OF THE INVENTION

In accordance with the principles of the present invention, a method of building a product location assignment database for use by a location assignment system comprises associating a physical location to fixtures in at least one venue. A unique identifier associated with each of a plurality of items in a catalog are received as input. A sub-plurality of the items are spatially matched to a physical location in the at least one venue, forming spatially matched items. The spatially matched items are stored in a product location assignment database. Each of the non-spatially matched items from among the plurality of items in the catalog are assigned a physical location in the at least one venue based on a most popular purchased item in a given group of the spatially matched items. The non-spatially matched items are stored in the product location assignment database as group matched items together with an assigned location. The given group of the spatially matched items are grouped based on a commonality of at least one product attribute associated with each of the spatially matched items.

In accordance with another aspect of the invention, a method of building a product location assignment database using RFID tag detection, for use by a location assignment system comprises associating a physical location to fixtures in at least one venue. A unique identifier associated with each of a plurality of items in a catalog are received as input. A sub-plurality of the plurality of items in the catalog are spatially matched by a location assignment system operating on a processor to a physical location in the at least one venue, based at least in part on a detection of an RFID tag attached to the respective spatially matched items, to generate spatially matched RFID items. The spatially matched RFID items are stored in a product location assignment database. A physical location in the at least one venue is assigned for each of the non-spatially matched items in the catalog based on a most popular purchased item in a given group of the spatially matched RFID items. The non-spatially matched items are stored in the product location assignment database as group matched items with an assigned location. In this way the given group of the spatially matched RFID items are grouped based on a commonality of at least one product attribute associated with each of the spatially matched items.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
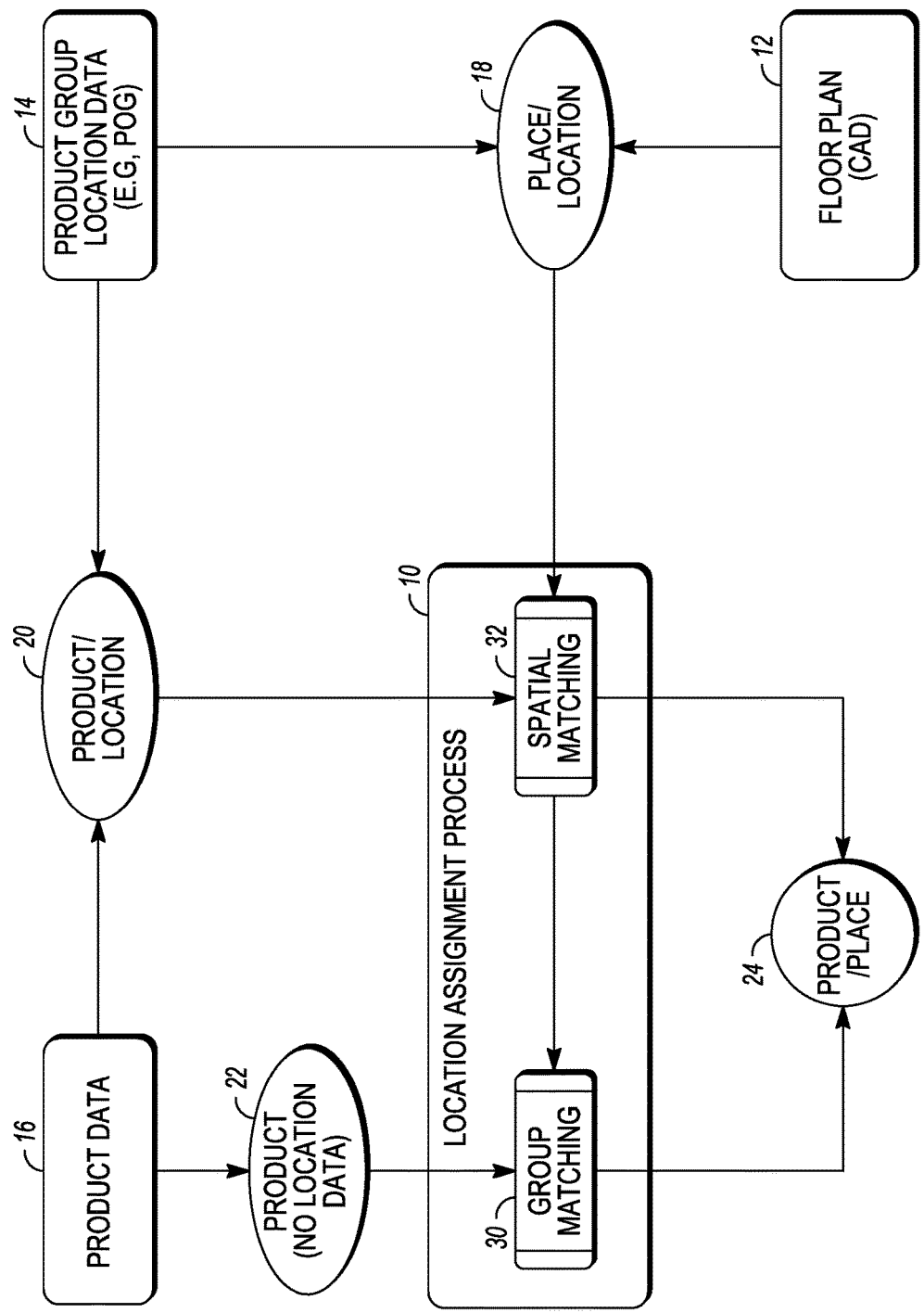
FIG. 1 is an overall view of the basic elements of a location assignment system that determines a location of items within a retail catalog that do not include physical location information, based on the location of other items within the retail catalog that are spatially matched with a physical location in the retail system, in accordance with the principles of the present invention.

A location assignment system and method disclosed herein assigns a location to items in a retail product line that otherwise do not include location information, such that there is a high probability that the assigned location of a given product is very likely where the product actually is located within a retail network, within a store, within a department, within a shelf.

Generally speaking, particular products that are explicitly identified on a current and accurate planogram have a given location. However, as noted, as much as 40% or more of a retail chain's product line may not be identified on a planogram and thus conventionally have no specific location assigned. The inventors hereof have appreciated that there is a need for a system which can determine a location of 100% of products in a retail system.

In the absence of data, the location assignment system uses specific rules and algorithms to assign a location for each product to inform about exactly where the product most likely is located by inferring a location of each product lacking location information from other items that do have a location, and assigning the most likely location to the item by storing location data associated with the item in an item location database.

The present invention provides a location assignment system and method which assigns a given location to each product in a retail system not otherwise identified on a planogram. Thus, given a complete catalog of every product sold in a given retail store system (which often runs in the tens of thousands or even hundreds of thousands of individual products—up to 40% of more of which have no location information within a planogram), the location assignment system assigns a location to every product sold.

The location assignment system utilizes information from the entire planogram system to infer and assign locations to products that do not otherwise have a location assigned. Thus, assigning location to the large percentage of items within a retail catalog of items that do not otherwise have location information enables an efficient and accurate physical search for the given product, even though the product is not identified in a current planogram.

The location assignment system provides an item location database that greatly simplifies order fulfillment for stores that take online and other types of orders for customers. The location assignment system also helps a shopper, or store employee, locate a given product within a physical retail space. The location assignment system can also be used to provide an inferred or assigned location of product to a stocker in a store such as a grocery store, or to an employee tasked with the chore of hanging the latest day's sales signs, e.g., "buy 2, get one free PVC elbow with a 1 inch I.D.". The location assignment system provides location to items in a retail item catalog that are not identified in any current planograms. The location assignment system provides an improved product or item location database for use by a retail employee tasked with physically checking inventory of, e.g., one hundred specified items. Using the improved and more complete item location database, the most efficient order for an employee to work through those one hundred specified items may also be generated by the location assignment system.

The location assignment system can itself influence the actual placement of items that are not on a planogram, thus improving the accuracy of the assigned location. For instance, a new item about to be stocked can be located where the location assignment system assigns its location to be.

First, all items within a retail catalog that are traceable to a physical location are assigned locations (i.e., spatially matched) by the location assignment system and stored in an item location database, the location assignment system then assigns locations to those items in the retailer's catalog that do not have location information or otherwise are not spatially matched. Thus, the location assignment system utilizes the spatially matched items in the product catalog for a given retail system, to infer and otherwise calculate a statistical most accurate location for each of the remaining items in the item catalog that do not include location information.

As an example, the location assignment system recognizes that there may be a planogram for a category type such as "cereal", but that there are, e.g., 47 varieties of cereal that aren't accounted for in the planogram. The location assignment system infers where each of the 47 varieties of cereal in the retailer's item catalog are specifically located based on all the other information that is available from product items that are spatially matched (i.e., have location information) based on physical location information extracted from planograms and CAD floor plans for the retail system.

In preferred embodiments, the location assignment system not only uses statistical information to infer and thus assign a location to products not otherwise assigned a location, but also preferably implements machine learning principles to better its location assignment process. For instance, if a product is assigned a given location that is not fully accurate or which can be improved upon, and is improved upon by a manual correction after an audit, the location assignment system stores that corrected location and learns from the basis of that correction to provide better weighting of various possible algorithms for determining a likely location of a similar product.

FIG. 1 is an overall view of the basic elements of a location assignment system that determines a location of items within a retail catalog that do not include physical location information, based on the location of other items within the retail catalog that are spatially matched with a physical location in the retail system, in accordance with the principles of the present invention.

The three main inputs to the location assignment system include the relevant retail system or store's catalog of items or product data 16, the product group location data which is most commonly a planogram (POG) 14, and the CAD floor plan(s) 12 of the stores in a given retail system.

The location assignment system importantly combines information from two different planning systems: from planograms, and from a floor plan, e.g., a computer aided design (CAD) model of each store's floorplan layout ("CAD").

Planograms, as discussed and used herein, preferably aren't usually a floorplan or a top down view of the store, but rather are an in-isle view as if someone was standing in front of a shelf of products. This may be referred to as a "z view", or altitudinal view, combined with an x-view or lateral view of the products on the shelf. The planogram is image based and data based in that planogram data indicates that, e.g., item one is on shelf one, position four, and that position four is 32" from the starting point of shelf one. The location assignment system in accordance with the invention breaks a planogram down into data that describes the location of product on the linear side.

As shown in FIG. 1, the product data 16 for each item in a retail systems catalog, and the planogram 14 come together to form product/location information 20. The planogram 14 and the CAD floor plan 12 come together to provide place/location information 18.

Planograms 14 for a given retail system are combined with the CAD floor plans 12 of relevant store(s), to produce place/location information 18.

First, the CAD floor plan 12 is aligned to the world such that every point in the CAD floor plan 12 is assigned a latitude/longitude. In disclosed embodiments, the latitude/longitude is provided, e.g., up to twelve decimal places or more.

Altitude data can also be assigned by the location assignment system if altitude data is included in the planogram. Altitude data is usually provided in terms of a relative altitude. For instance, the planogram 14 may provide that shelf one is 24" high, or no explicit altitude information is provided but that a plurality of shelves are identified, such as "shelf 1, shelf 2, shelf 3, shelf 4. The location assignment system infers that shelf 2 is above shelf 1, shelf 3 is above shelf 2, etc.

The location assignment system also determines altitude information from information about the size of given products. Thus, the location assignment system infers, e.g., that the maximum size of all items in the planogram on shelf 1 is 12", and therefore shelf 2 must be at least 12" off the ground (and more likely 15" off the ground). Then, for shelf 2, the location assignment system identifies the maximum height of all the products in the planogram for shelf 2 to infer the likely relative altitude of shelf 3, etc.

Fixtures in the CAD floor plan 12 data itself are categorized into particular types of shapes. For instance, it is determined if the shape in the CAD floor plan 12 is a fixture, if the fixture is a shelf, or a display rack, or a service desk. The CAD floor plan 12 itself is a computer data file and based on data. The location assignment system identifies meta data associated with the relevant object in the computer data file comprising the CAD floor plan 12 to determine the identity of the shape, e.g., whether it is a fixture, shelf, service desk, etc.

In disclosed embodiments, the location assignment system extracts a text label associated with each of the items in the CAD floor plan 12 data file, and associates that text label with a normalized type, e.g., a shelf, a display rack, an end cap, etc.

Figure 1A:
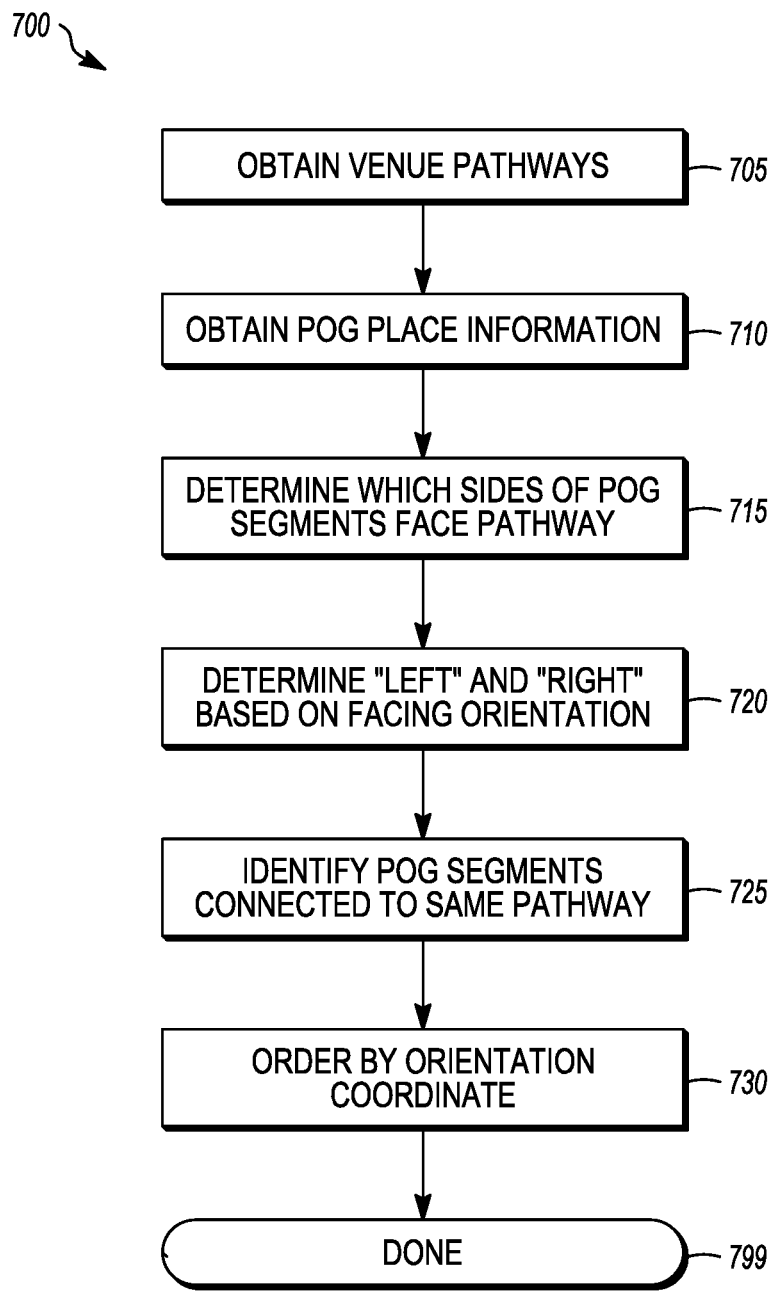
FIG. 1A shows an exemplary endcap process for identifying an endcap in a planogram.

FIG. 1A shows an exemplary endcap process 700 for identifying an endcap in a planogram.

In step 705, the location assignment system obtains venue pathways from a relevant CAD floor plan 12.

In step 710, planogram place information is obtained by the location assignment system.

In step 715, the location assignment system determines which sides of a given planogram face the venue pathways obtained in step 705.

In step 720, the location assignment system determines "left" and "right" sides of an endcap based on a facing orientation of the planogram.

In step 725, the location assignment system identifies planogram segments connected to a same venue pathway.

In step 730, the endcaps are ordered by an orientation coordinate, and the process ends in step 799.

In some disclosed embodiments, the location assignment system extracts textual information from the CAD floor plan 12 data file that identifies a particular planogram 14 that goes on the relevant fixture. This is the case even if the object in the CAD floor plan 12 data file is not explicitly linked to given products. Example data extracted from the CAD floor plan 12 data file includes a very explicit product type identifier such as "cereal", or a more generic CAD floor plan ID, or nothing at all. Even when no information is extracted from a CAD floor plan 12 data file, the location assignment system nevertheless identifies the fixtures within the CAD floor plan 12 as a place eligible to hold product.

The location assignment system infers associations of product identified on a planogram 14 to the object on the CAD floor plan 12 based on a text label extracted from the CAD floor plan 12 data file, e.g., a text label in a CAD floor plan 12 data file such as "planogram ABC goes on this fixture". The location assignment system explicitly assigns locations of the products in the planogram 14 to the given fixture in the CAD floor plan 12.

The location assignment system determines location information for as many items or products in a retailer's catalog based on an extracted intersection between the CAD floor plan 12 and all available planograms 14. In other words, the location assignment system aligns as many planograms 14 as possible to the relevant CAD floor plan 12. Inevitably there may be one or more planograms 14 that cannot be associated to CAD floor plan 12 data, i.e., the location assignment system is not able to place one or more planograms 14 for a given retail system on one or more CAD floor plans 12 for the retailer.

A primary purpose of the location assignment system is to create a reliable product location assignment database 300 (FIG. 6) indicating a location of every item in a retailer's product line or catalog. The location assignment system first attempts a spatial match for each item in the retailer's product line or catalog, by extracting information obtained by intersecting the planograms 14 in a retail store or system to items in the retail system's product line or catalog. In other words, locations are assigned for as many items in the retail system's complete catalog as can be matched to a planogram 14. This is referred to herein as 'spatial matching' because the item or product's location is assigned based on information associated to a hard location (e.g., ultimately traceable to a lat/lon of a CAD floor plan).

Thereafter the location assignment system attempts a group match for each item in the retailer's product line or catalog that did not have an associated physical location. Often at least 25%, and usually much more, of the retail system's complete catalog are not in any planogram 14. The location assignment system in accordance with the principles of the present invention solves the problems created by this "at least 25%" not having location by accurately and statistically assigning a location to each item in the "at least 25%", creating a useful and complete product location assignment database 300.

The location assignment system in certain embodiments enables the ability to generate a visualization of all products in the catalog at any given view, using both known locations of certain products from a relevant planogram 14, together with assigned locations generated by the location assignment system. Thus, the location assignment system in some embodiments not only assigns locations to products not included in planogram 14 data, but also determines where on a given shelf the particular product is and how far down the shelf it runs. Thus, in other words, the location assignment system not only assigns locations to a significant portion of a product line of a particular retail system (the "at least 25%"), but also includes the capability to assign a range of shelf space given to a product so as to enable generation of visual views. The visual views may be a shelf view showing a relevant fixture, or products on shelves of a specific department in a specific store of a retail chain.

The location assignment system provides different levels of product location for any given item within the catalog. For instance, for any given item in the catalog, a planogram 14 might provide information indicating that the product is planogrammed. The planogram 14 may relate to, e.g., forty linear feet of shelving, broken into four, ten foot segments, that a first segment covers a first set of items, a second segment covers a second set of items, etc.

But some planograms 14 do not include segment information-just information generally relating to, e.g., a ten foot planogram 14, or a forty foot planogram 14, even though the associated CAD floor plan 12 may have fixtures that are broken down into some sort of logical size, e.g., four foot sections, or eight foot sections. Thus, much of the alignment of the planogram 14 to the CAD floor plan 12 is associating the segment of the planogram 14 to the relevant point along a given fixture in the CAD floor plan 12.

The location assignment system presumes that there are no empty shelves in a given store, out-of-stock situations aside. However, it is within the principles of the present invention to include stock volume in the product location assignment database 300 such that an out-of-stock situation would be reported to someone trying to locate the out-of-stock item.

The location assignment system attempts to ensure that as many of the segments or sections identified in a CAD floor plan 12 are assigned to a planogram 14 or assigned in some way that is associated with product. Thus, e.g., on a four foot section of the shelf there may be a planogram name and a planogram segment number (e.g., "cereal, segment two").

There may also only be general information merely identifying "grocery department" or "boxed groceries", "dry goods", etc. Thus, there is a hierarchy of categories that can be associated with a given area of the store, or associated with a particular fixture. The location assignment system attempts to assign such general information algorithmically.

In assigning location to a given product, the location assignment system distinguishes between a spatial match for that product, and group matching.

Spatial matching refers herein to a match of an attribute of the physical item in the product catalog, to items within the catalog that do include location information, thus enabling it to be placed at a given physical space in a given store. Spatial matching is performed by the location assignment system in the early stage of intersecting the planogram 14 to the relevant CAD floor plan 12.

The location assignment system includes rules for assigning which segments identified in a CAD floor plan 12 goes to which planogram 14 based on its orientation in space.

In accordance with the present invention, the location assignment system defines the area of any given department based on the contents. This is particularly important because items of a certain category may be placed in such a way that the departments themselves become defined by their contents.

The location assignment system preferably assigns segment numbers, etc., based on a distance from checkout aisle and/or a distance from store opening.

The location assignment system uses spatially matched product location data (e.g., data indicating that "16 oz. box of POST Grape Nuts brand cereal goes exactly here") to then algorithmically and statistically assign a nearby location to a different but related product (e.g., a 20 oz. box of POST Grape Nuts brand cereal that does not have spatially matched location data) such that the assigned location identifies where on what shelf or other fixture the 20 oz. box of POST Grape Nuts brand cereal sits.

When product/location information 20 is not generated by an intersection of the product data 16 and the planogram 14, the location assignment system passes product data 16 that has no location data 22 to a location assignment process 10. The location assignment process 10 is the process by which location of each item is assigned. The location assignment process 10 utilizes as input either spatially matched location information from a spatial matching process 32, or if spatial matching is not successful then from input by a group matching process 30.

Spatial matching 32 refers to the instance when an actual location is determined. Group matching 30 refers to the instance whereby a weighted set of similarity algorithms identifying a relevant group within the location assignment process 10 to statistically infer and assign a location based on similarity to other products that were spatially matched and are stored in the product location assignment database 300 as such.

Thus, the location assignment process 10 assigns a product/place 24 (i.e., location) for each input product, whether the product has location data, has mismatched or otherwise defective location data, or has no location data at all. Items that have locations assigned based on their own location data are referred to herein as hard-assigned or spatially matched item locations. Items that have locations assigned based on the location of other items are referred to herein as soft-assigned item locations, or fallback locations. In some embodiments, the items are tagged within the product location assignment database 300 as having either a spatially matched location, or a group matched location.

Preferably, the location assignment system processes input items within the retail catalog that have valid location data first, and stores assigned locations in the product location assignment database 300. Thereafter, the remainder of items within the retail catalog, i.e., those either with no location data, or those with mismatched or unusable location data, are assigned locations using the location assignment system. In this way, a structure is first established whereby items with locations are used to form a basis for statistical assignment of location to the remaining items in the catalog.

Figure 2:
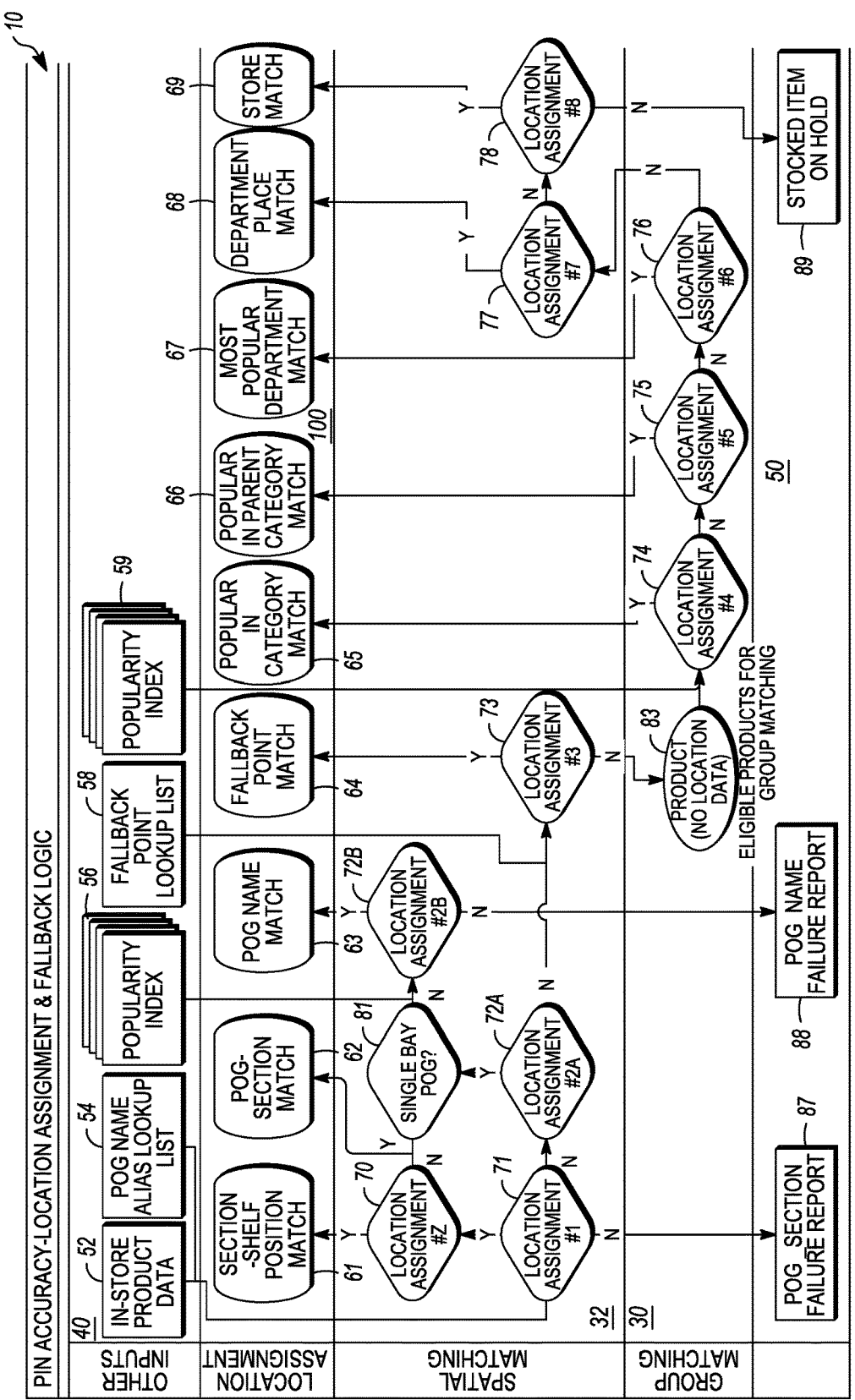
FIG. 2 shows the flow and algorithm of a location assignment system, in accordance with the invention.

FIG. 2 shows the flow and algorithm of a location assignment system, in accordance with the invention.

The various input information 40 to the location assignment system is shown across the input row 40 of FIG. 2. Location assignment 100 as shown in the second row of FIG. 2 relates to a matched process for assigning the location for a given input product. The location assignment system iterates between the input row 40 and the location assignment 100 row of FIG. 2 for each item in the retailer's item catalog. A plurality of iterations may be required to first identify all items capable of being spatially matched for location first, and thereafter statistically assigning location for each of the remaining items in the catalog.

Spatial matching 32 processes are depicted across the third row of FIG. 2. Spatial matching 32 in FIG. 2 relates to actual location information provided for a given item, most notably from an extracted intersection between planograms 14 and the CAD floor plan(s) 12.

Group matching 30 processes are depicted across the fourth row of FIG. 2. Group matching 30 in FIG. 2 relates to items that are not successfully spatially matched by the spatial matching 32 processes shown across the fourth row of FIG. 2.

The bottom row of FIG. 2 depicts exception reporting or other error reporting of those items within a retail systems entire list of products which were not assigned a location through the location assignment system.

The inputs 40 to the location assignment system include the list of product items in a catalog, or "in-store product data" 52, planogram (POG) name alias lookup list 54, popularity index 56, fallback point lookup list 58, and another instance of the popularity index 56.

The location assignment process 10 includes a series of algorithms based on the type of location that is being inferred with an increasing accuracy or desirability scale, from most accurate and most desirable match at the section-shelf position match 61, to the least accurate and least desirable store match 69. Between the section-shelf position match 61 and the store match 69 are a planogram-section match 62, a planogram name match 63, a fallback point match 64, a popular in category match 65, a popular in parent category match 66, a most popular department match 67, and a department place match 68, with the highest level of match being a store match 69.

The spatial matching process 32 determines if an actual location for the input product is available. The spatial matching 32 includes a first check of location assignment #Z 70, then if that fails a location assignment #1 71, then if that fails a location assignment #2A 72A, then if that fails a location assignment #3 73. Location assignments #Z 70, #1 71, #2A 72A and #3 73 are all spatial matches to actual location information at increasing levels of accuracy and desirability. Location assignment #2B 72B is also a spatial matching process.

Conventional location systems utilize spatial matching principles primarily. Conventional location systems do not assign location based on principles associated with the cascade of location assignment #3 73, location assignment #4 74, location assignment #5 75, location assignment #6 76, location assignment #7 77, and location assignment #8 78.

The information regarding items in a store may comprise, for example, a SKU, UPC, a product name, or another unique identifier for a product, whether the item is in inventory, the number of items in inventory, a category assigned to the item, an n-level parent category assigned to the item or to the category of the item (e.g., Nike Air; athletic shoe; shoe; apparel; etc.), a department assigned to the item, and a store or venue assigned to the item. The categories and/or n-parent categories may be arranged in a hierarchical schema, such as, for example, "clothing/shoes/running shoes/Nike/Air-Jordan", wherein "clothing" is further from a leaf-node, such as "Air-Jordan", and wherein "shoes" and "running shoes" are nodes at intermediate levels (many other layers in the hierarchy or an alternative hierarchy may be present—this is merely an example). Categories and n-level parent categories assigned to an item and/or to the category of item may be stored as, for example, one or more category records. Category records may comprise information regarding a level in the category schema. The information regarding items in a store may be stored in, for example, in one or more item catalog records (which may refer to or incorporate other records, such as category records).

In FIG. 2, the location assignment #Z 70 is associated with a section/shelf position match 61 type location assignment. In location assignment #Z 70, if 3-dimensional (3D) location information is known for a product, including, e.g., what shelf, and a position on the shelf, that the product is located. The location assignment process can provide a Z-view, or personal view depicting the shelf, showing exactly where the product is located on the shelf.

Thereafter the location assignments #2A 72A through #8 78 gradually result in less and less accurate location information for a product having no location information.

For instance, location assignment #2A 72A is associated with a planogram (POG) section match 62 type location assignment. In location assignment #1 71, the location assignment process has good product data, it's on a planogram 14, and that planogram 14 is successfully located on a CAD floor plan 12, the exact segment is known. Thus, location assignment #1 71, if successful, results in a POG/Bay or POG/Segment match. Location assignment #1 71 is the most accurate location for a product from a 2-dimensional standpoint, and generates a location polygon where the product is located.

In location assignment #2A 72A, the location assignment process has identified a planogram 14 including the product, but the location assignment process does not have segment data within that planogram 14. Thus, the resulting location information for the relevant product can only specify, e.g., that the product is within a forty foot segment of a fixture on a CAD floor plan 12.

The location assignment #2A 72A falls back to determine if the identified planogram 14 is a single bay planogram 81. If so, the planogram 14 itself may be associated with a smaller section, e.g., an eight foot section in the store. So therefore the location assigned by the location assignment #2A 72A is as good or accurate as a result from location assignment #1 71 because the product is located in a single bay planogram (POG). Thus, location assignment #1 71 and location assignment #2A 72A can both result in a planogram (POG) section match 62 type location assignment.

The popularity index 56 depicts use of a weighted set of similarity parameters for identifying a best spatially matched product that is closest in similarity to the relevant product that is having its location assigned by the location assignment process. The second instance of the popularity index 59 shown on FIG. 2 has the same functionality and algorithms as does the popularity index 56, but is seeded from a different point in the location assignment as shown in FIG. 2. Thus, the popularity index 56 determines and provides to the location assignment #2B 72B process a most popular item within a planogram for use by the location assignment #2B 72B, whereas the popularity index 59 determines and provides to the location assignment process #4 74 a most popular item within a specific category of items for use by the location assignment #4 74, location assignment #5 75 and the location assignment #6 76. The weighted set of similarity parameters of the popularity indexes 56, 59 will be detailed later with reference to FIG. 3.

Thus, as an example, say the input product is a can of soup that a buyer recently purchased for sale by the store, but was never added to the planogram that includes major brands of soup. The location assignment process is aware that the store is selling the new soup from, e.g., point of sale (POS) records for a given store. A match of brand to another soup of that brand that does have location information may be used to infer the location of the new can of soup.

Location assignment #2B 72B is associated with a planogram (POG) name match 63 type location assignment. In location assignment #2B 72B, the planogram name match 63 relates to where the planogram occupies more than one segment of the store, but the location assignment system was unable to obtain with sufficient confidence which segment the product should have its location assigned to. Thus, the successful location assignment #2B 72B results in assigning a location to the named planogram (POG), as depicted by the POG name match 63 type location assignment.

In FIG. 2, the fallback point lookup list 58 relates to items not specifically identified on a planogram 14, but are generally designated for a given type product. For instance, a third-party vendor may be themselves managing a given area of shelves. For instance, potato chip manufacturers often themselves stock a section of shelves designated for their use, without guidance from the store or the store's planograms 14. As a result, a planogram 14 may be generally named, e.g., "beer" or "chips". Or, in some store systems, beer or chips may be generally tagged in a CAD floor plan 12 indicating a general location for all beer or for all chips.

If the spatial matching fails to succeed in assigning location information for a given product, then the location assignment proceeds to statistically infer a location for the input product by the group matching process 30. The group matching process 30 of the location assignment system provides an inferred location of a product not having location data.

During the group matching process 30, the location assignment system determines if the input product is eligible for group matching 83. To be eligible for group matching 83 the input product has no location data. If eligible, the location assignment system attempts to assign a location to the input product using location assignment process #4 74. If successful using the location assignment process #4 74, then the location assignment system assigns that successfully identified location based on a most popular item (using weighted heuristics of the popularity index 59) matching a category 65 of the input product. If not successful, then the location assignment process proceeds to location assignment process #5 75.

The location assignment system then attempts to assign a location to the input product using location assignment process #5 75. If successful using the location assignment process #5 75, then the location assignment system assigns that successfully identified location based on a most popular item (using weighted heuristics of the popularity index 59) matching a parent category 66 of the input product. If not successful, then the location assignment process proceeds to location assignment process #6 76.

The location assignment system then attempts to assign a location to the input product using location assignment process #6 76. If successful using the location assignment process #6 76, then the location assignment system assigns that successfully identified location based on a weighting of a most popular product in a department 67. If not successful, then the location assignment process proceeds to location assignment process #7 77.

Location assignment process #7 77 assigns the location of a department place 68 to the input product. Since the location of a department is generally understood to be an actual location, location assignment process #7 77 is a spatially matched location, albeit at a rather inaccurate level. The difference between a location assigned by location assignment process #6 76 and a location assigned by location assignment process #7 77 is that location assignment process #6 76 actually assigns a place on a bay, shelf or segment (using a proxy item which is the most popular within the department), whereas location assignment process #7 77 results in an assigned location that indicates the item can be anywhere within a given department place 68.

The distinction is useful particularly when visually rendering the assigned location to a user. For instance, if a user enters a query subsequent to assignment by the location assignment system of all items in a retail catalog to locate a specific item, a location assigned via location assignment process #6 76 would result in a shading or other indicator of a particular place on a shelf; whereas a location assigned via location assignment process #7 77 results in a shading of an entire department.

When the location assignment 10 reaches the need to resort to location assignment process #7 77, or location assignment process #8 78, that means that the location assignment system doesn't know where the item is located, and can only resort to assignment of the items location as being anywhere within a given department (department match 68), or as being anywhere within a given store (store match 69), respectively.

In disclosed embodiments, the popularity index 56 is not used by location assignment process #7 77 or location assignment process #8 78 as those locations, while being technically spatially matched to the physical location of a given department place 68 (e.g., a center point of a department), or of a given store 69 (e.g., to the front door of the given store), the assigned location is so broad as to be more relevant than the location of a most popular item in a department (location assignment process #7 77) or a most popular item in a store (location assignment process #8 78) using any product attribute heuristic.

Similarly, if the department match 67 location assignment process #7 77 fails, then the final location assignment is that of the location of the store 69, which, similar to the department place match 68 is a known location, and thus is considered a spatially matched location.

Thus, the first one of the location assignment processes #Z 70 through #8 78 to succeed results in assignment of that best location assignment match of the input product based on output generated by that successful assignment process.

Exceptions (e.g., failures to assign a location to any given product within the retail system) generally result in exception reporting 50.

For instance, if location assignment in location assignment #1 71 fails, a POG section failure report 87 may be issued.

If location assignment in location assignment #2B 72B fails, a POG name failure report 88 may be issued. This is the situation where an item is on a planogram 14, but the planogram 14 does not get matched with a place on a CAD floor plan 12. This may happen, for example, when a planogram 14 evolves to include additional product types, but the CAD floor plan 12 hasn't yet been updated to show the new name of the planogram 14. In this scenario the planogram 14 doesn't match the CAD floor plan 12 and thus the location assignment process would produce an exception report 50 for the newly named planogram 14.

In an additional embodiment, the location assignment system, subsequent to failure to succeed in assigning a location by location assignment #2B 72B, before moving on to location assignment #3 73, the location assignment system determines if the relevant item is found in a planogram 14 by another name.

If the last location assignment #8 78 fails, a stocked item on hold report 89 may be issued.

Figure 3:
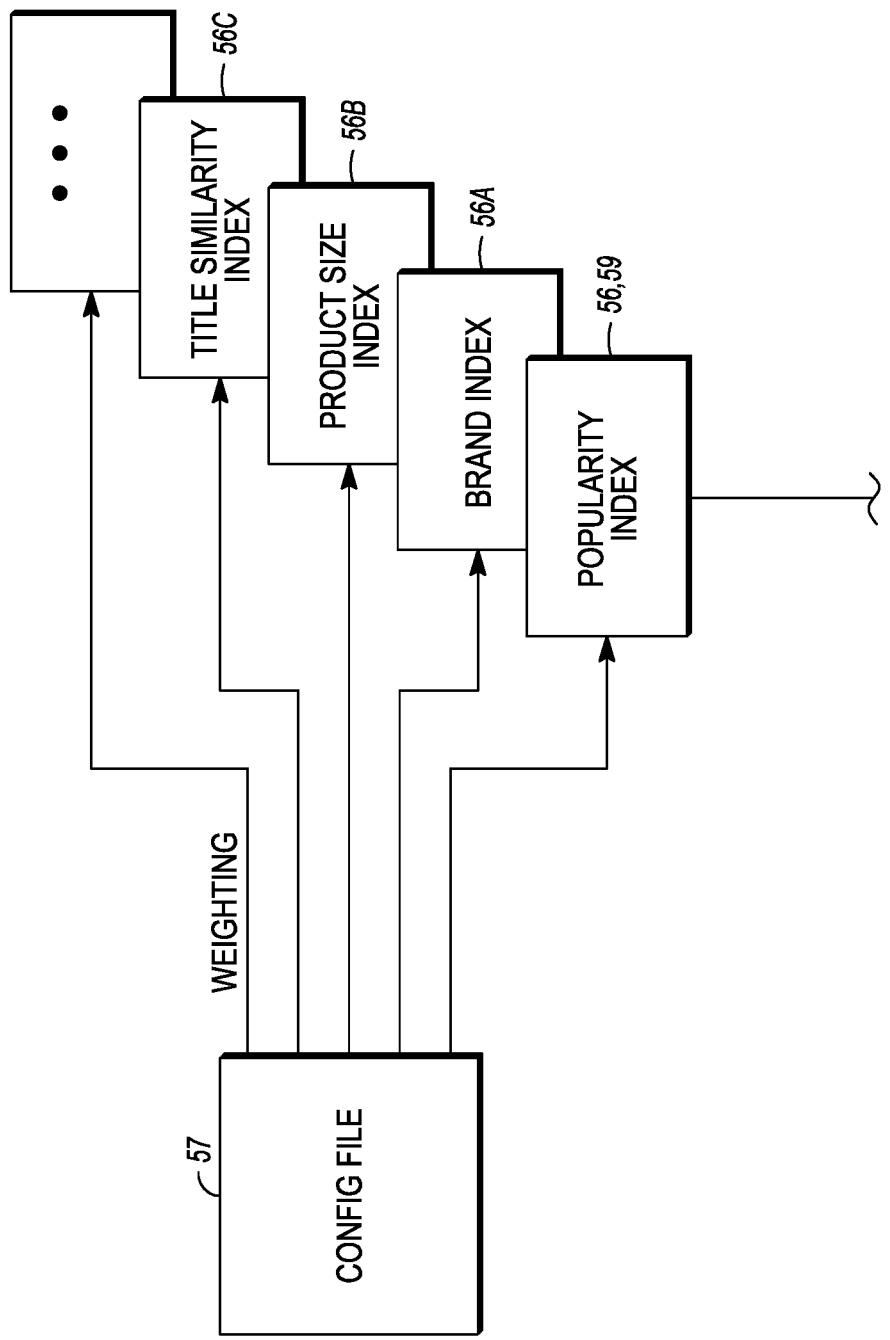
FIG. 3 shows the weighted functionality of determining a closest spatially matched similar product.

FIG. 3 shows the weighted functionality of determining a closest spatially matched similar product using popularity index 56, or of determining a closest spatially matched similar product for group matching 30 using popularity index 59.

In particular, the popularity indexes 56, 59 preferably comprise a plurality of separate algorithms for determining a closest spatially matched similar product. In preferred embodiments, the results of each of the plurality of separate algorithms for determining a closest spatially matched similar product are weighted, such that the successful one of the plurality of separate algorithms having a highest weight will identify the best similar product from which the location assignment process infers the location of the relevant product without location data.

The popularity indexes 56, 59 identify the most popular spatially matched product within the category of the product that does not have location data. From this result, the location assignment process attempts to assign a location near the most popular spatially matched product in the category.

Machine learning is preferably implemented in the location assignment process whereby the weighting of a cascading series of different heuristics or algorithms associating attributes of a product is adjusted based on machine learning from input corrections. The different types of indexing that may be separately weighted by the machine learning process include a ranking of a popularity index 56, 59 of products within a given category. Another weighted index is similarity in title of the item 56C. Another weighted index is a similarity in size of the product 56B. Another weighted index is a brand name 56A. Other optional weighted indexes include price of items, profit margin of items, items having a promotional status, or other criteria. A common price attribute may also be used, e.g., a match of the last two digits of a price (the cents portion). For instance, phases of clearance of items may be designated by use of a same cents portion in a price, such as items ending in the price of $xx.99 (99 cents), vs. items ending in $xx.97 (97 cents), vs. items ending in $xx.93 (93 cents).

Thus, what is shown in FIG. 3 as a popularity index 56, 59 is preferably actually a multidimensional array of weighted indexes 56, 56A, 56B, 56C.

The machine learning for the cascading series of different heuristics 56, 56A, 56B, 56C may identify that certain types of products are best located using a given type heuristic. For instance, grocery items may best be assigned location based on the popularity index 56; frozen goods may best be assigned using title similarity index 56C or brand index 56A.

Other heuristics used to assign location for the item for which location is being assigned, using as a proxy the most popular item from among those sorted by the item brand 56A or the item title 56c, or the item size 56B, it could also be, e.g., the item vendor, the item distributor, the item price, etc. Essentially any product attribute that has data associated with that attribute may be used to form a weighted heuristic for use in the popularity index 56.

The heuristics are weighted as desired (either by machine learning and/or manual audit followed by corrections, and the item identified by the array within the popularity index 56 having the highest confidence (highest weight) will be assigned as a proxy item to be used to assign location to the item having location assigned. The weightings of the various heuristics are configured, e.g., using a configuration file 57.

The heuristic indexes 56, 56A, 56B, 56C need not be used if location assignment #1 71 is successful because the location assignment process has then already assigned a most accurate location to the product.

In location assignment #2A 72A, if the planogram is not a single bay planogram 81, and the location assignment #2A 72A is not otherwise successful in identifying a location of the product, then the heuristic indexes 56, 56A, 56B, 56C are utilized to determine which segment of the planogram has the best confidence of being the most accurate, e.g., the most popular spatially matched item, and thus the location of that most popular spatially matched item is used to assign the location of the product that is being assigned a location.

In location assignment #3 73, the heuristic indexes 56, 56A, 56B, 56C need not be utilized because the product with no location data is already being assigned the location of a general category such as "beer" or "chips".

Figure 6:
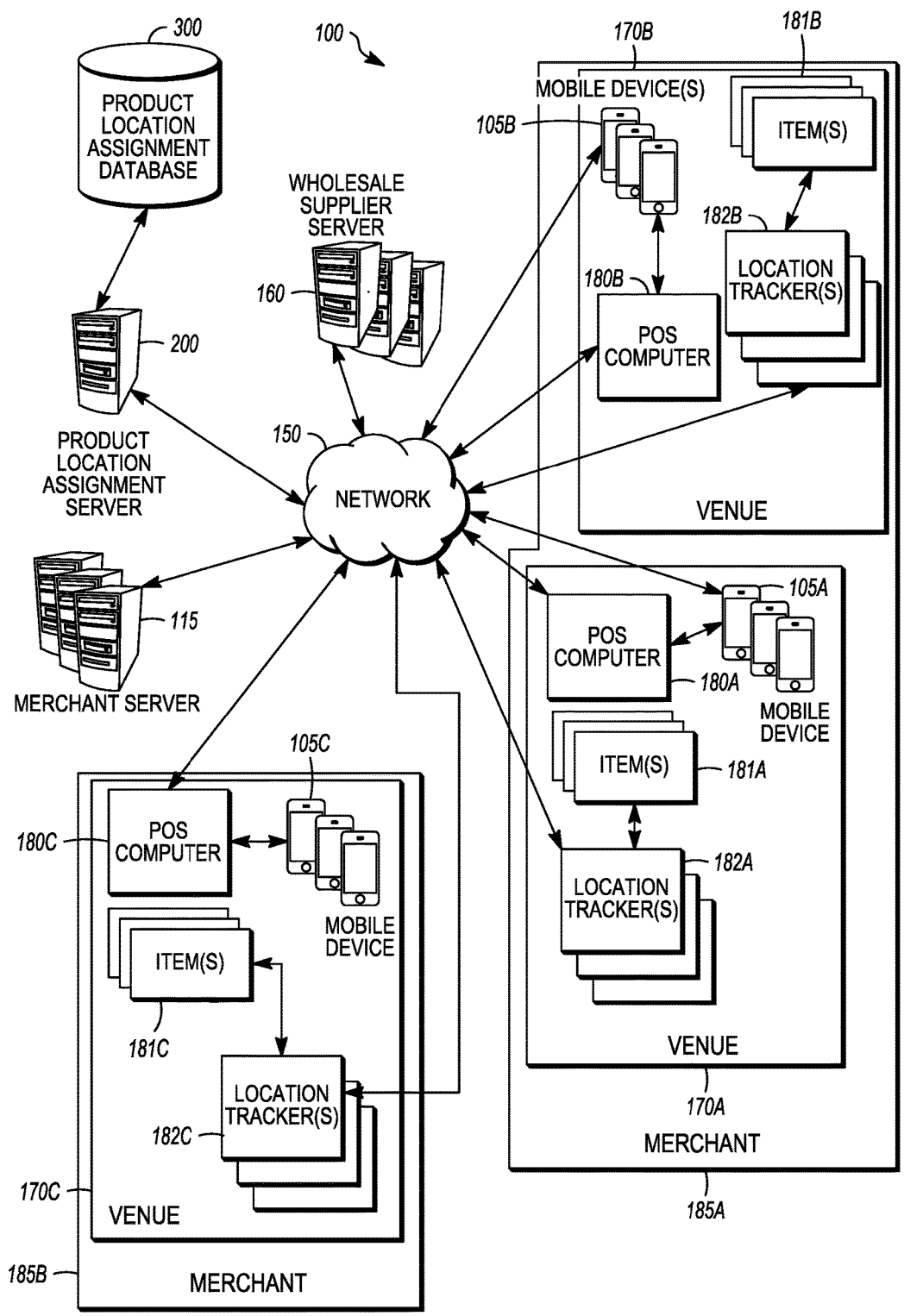
FIG. 6 illustrates an exemplary product location assignment system including a product location assignment server, one or more merchant servers, one or more wholesale supplier servers, and one or more mobile devices, connected to a network, in accordance with the principles of the present invention.

The popularity indexes 56, 59 may receive point of sale (POS) data from, for example, a POS terminal 180A, 180B and/or merchant server 115 (FIG. 6). Exemplary POS data may comprise, for example, a SKU, UPC, a product name, or another unique identifier for an Item as well as a price, tax, discount amounts, a date on which a transaction occurred, and a transaction identifier. From the POS data the location assignment system determines a most popular item within given parameters by determining which item within a defined group, category, etc. sold the most units during a given time frame.

The popularity indexes 56, 59 may match items in the retailers item catalog to POS data according to, for example SKU, UPC, product name or other unique identifier. As used herein, "unique identifier" refers to a SKU, UPC, product name or the like which can uniquely identify an item. Unique identifiers may be found in the retailer's item catalog, in the planogram 14, in POS data and/or in data sets derived from these data sets, such as in popindex, place-planogram, item-planogram, and item proxy location records. A table of synonyms, or similar may equate different unique identifiers as being the same. Synonyms may also be used to equate other identifiers or other data sets, such as entries in a planogram 14 and map labels in a CAD floor plan 12. More than one set of synonyms may be used in different contexts.

The popularity indexes 56, 59 may sort items by, for example, date-time and may sort or group according to, for example, category, parent category, department, and store (such as if the POS data is from more than one store). The popularity indexes 56, 59 determine the total number of each item sold (or otherwise obtained at the venue) within a time unit, such as within a thirteen month window (which window may be selected to smooth seasonal fluctuations). The popularity indexes 56, 59 may also determine the average price of each item, or the most popular items, across the time unit.

After location assignment #3 73, the location assignment process determines eligible products for group matching 83. Thus far described, location assignments #1 71 through #3 73 assign locations based on spatially matched products matched to a discrete point in space. Generally speaking, perhaps 75% of the products in a typical product catalog will be successfully assigned in the location assignment process by location assignment #3 73. However, location assignments #4 74, #5 75 and #6 76 are based on proxy item locations, or use of another item as a proxy for the location of the product with no location data.

Thus, the input to location assignment #4 74, #5 75 and #6 76 are products without location data, and thus are referred to as group matching 30. So, if all of the attempts at spatial matching 32 in location assignments #1 71, #2 72 and #3 73 are unsuccessful, then group matching 32 is attempted. The location assignments #4 74, #5 75, and $6 76 utilizes attributes of the item, i.e., the category of the item (location assignment #4 74), the parent category of the item (location assignment #5 75), and the department of the item (location assignment #6 76).

Thus, location assignment #4 74 relates to an attempt by the location assignment process to assign location of the product having no location data, based on the proxy location of a spatially matched most popular item in a same department/same parent category/same category 65. Location assignment #5 75 relates to an attempt by the location assignment process to assign location of the product having no location data, based on the proxy location of a spatially matched most popular item in a same department/same parent category match 66. Location assignment #6 76 relates to an attempt by the location assignment process to assign location of the product having no location data, based on the proxy location of a spatially matched most popular item in only a same department match 67. Within the first successful one of the location assignment process #4 74, #5 75, or #6 76, the location of the item with no location is assigned to be the location of the most popular item within the relevant category, parent category, or department.

The situation arises where an item in a catalog has location data, nevertheless the location assignment system is unable to assign a location for that item for another reason. For instance, the location data associated with the item may be unable to be matched to a place on the CAD floor plan. In such an instance, the location assignment system applies group matching techniques to assign a location to the item that is located on the CAD floor plan.

The present inventors have appreciated that apparel is frequently shipped with radio-frequency identification ("RFID") tags or the like, as opposed to groceries which are not usually RFID tagged. But sometimes RFID tags are deactivated upon delivery to a distributor—before it reaches the retail store. This may occur, for example, because the manufacturer or an intermediary is paid by the distributor rather than by the retailer. As a result, it is possible for retailers and those tracking products in some retail locations to use RFID tags to track the actual location of some apparel, though the RFID data is almost certainly incomplete. Unfortunately, since only a portion of apparel can be tracked using RFID tags, there is less rationale to set up and maintain equipment capable of providing RFID tracking services.

Heretofore embodiments assign location based on a plan, i.e., to where a product is planned to be, and those items not found on the plan are assigned to a location based on those products that are found on the plan. Use of radio frequency ID (RFID) input overrides a planned location with an actually read physical location read in real time, e.g., when the location assignment system operates.

Figure 4:
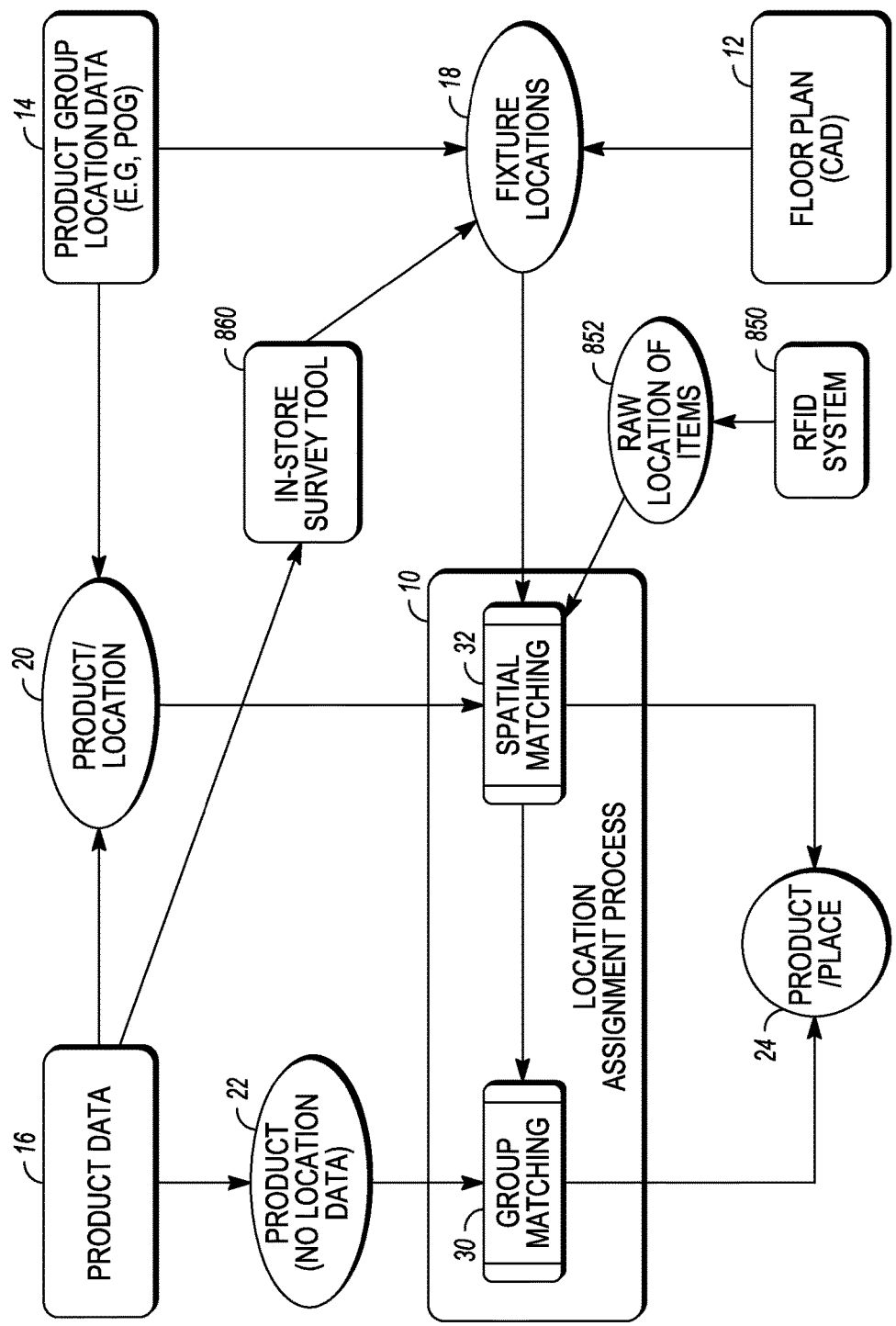
FIG. 4 shows location assignment system including an RFID capability, in accordance with the principles of the present invention.

FIG. 4 shows location assignment system including an RFID capability, in accordance with the principles of the present invention.

In particular, another embodiment of the location assignment system utilizes RFID information as another method of gaining a high confidence for an assigned location of a given product that doesn't have a location in a planogram. The location assignment system in accordance with these embodiments recognize that while there may not be planogram data relating to the location of a given product, there is a system in place whereby a number of related products include RFID tags which can be used to provide actual locations of the RFID tagged items, and assigned locations assigned to similar items near or otherwise related in any of a variety of ways to items that do have RFID tags. The actual locations may be determined using a match of both the x,y location of the particular RFID tag reader that detects the RFID tag of a given item, and CAD floor plan data that includes fixtures within that zone capable of holding the known size, shape, etc. of the item for which an RFID tag was detected. For example, a clothes rack.

As shown in FIG. 4, the product data 16, CAD floor plan 12, product group location data 14, and location assignment process 10 are otherwise as shown and described with reference to FIG. 1. However, in this embodiment, an RFID system 850 produces product locations in terms of raw location in space 852, usually in the context of either lat/lon or in pixel XY on a map of the store. The location assignment system performs two general tasks with respect to RFID: First the location assignment system inputs raw RFID locations and associates the raw location to a physical fixture. For instance, this indicates that the location assignment system has information indicating that the items aren't merchandized on the floor surrounding the fixtures, therefore, the location assignment system snaps the raw location to the actual physical fixture location using two methods. (There could be other false positives that are preferably factored out of the RFID system, e.g. RFID tags that were in motion when detected, e.g., in a moving shopping cart, or located in an area where items would not be merchandised, e.g., in a fitting room or stock room. (1) The location assignment system identifies the raw locations and determines logical groupings (e.g., by category or brand), and then finds the nearest available fixture. (2) The location assignment system identifies the individual items and attempts to match them to nearby fixtures based on similarities to items already assigned to the nearby fixtures using another spatial match type, e.g., location assignment process #1 71, or location assignment process #2A 72A.

Once the RFID items are assigned to a fixture, they are used as additional inputs for group matching 30 (i.e., location assignment process #4 74 through location assignment process #7 77).

The variety of relationships can be weighted by an administrator to provide optimal results for a particular retail system. Alternatively, the weighting may be adjusted based on an audited outcome that feeds into a learned history for the given retailer or other retail systems. The weightings may also be configured, e.g., by the retailer for each store. For instance, a strategy for one particular store might be to keep all the same branded items together. Thus, the weighting in the heuristics used for selecting the proxy item used for assignment to the item without location data may be set heavily in favor of selection based on a most popular item with spatially matched location within a given brand.

Thus, when an item that does not have a spatially matched location and doesn't have an RFID tag, the location assignment system algorithmically determines an association between the item that does not have a location, and items that do have RFID tag-based locations. The association may be the same brand, the same category, the same size, etc. These associations may be weighted to provide an optimal accuracy and precision in assignment of location to items.

RFID tags are often related to apparel based items, e.g., sweaters, sweatshirts. According to the present invention, for items that don't have RFID tags on them, we can use the same item location fallback algorithms to co-locate other items that might be similar to those that have RFID tags on them.

The point here is that you might have some suppliers of, e.g., shoes, which have RFID tags, but other suppliers of similar shoes don't have RFID tags. If the items are similar enough (e.g., different brands of the same style shoe), then the location assignment system presumes that they would be co-located in the same area as the similar shoes that do have RFID tags on them.

An RFID system is independent of a map system. An RFID system returns a number of x,y coordinates of items that indicates that certain items are at those x,y positions relative to the RFID reader. RFID readers may be dispursed about a store location in known locations, and thus the RFID items locations are known relative to the location of the RFID reader that reads the RFID item.

The location assignment system takes the x,y positions and associates those x,y positions on a store fixture. Thus, rather than assigning a location to an item in the middle of an isle where a category of items is expected to be located, the location assignment system knows that these RFID items are going to be on a fixture somewhere, so the location assignment system determines which fixture among possible fixtures that are within range of an RFID reader that read a given RFID tag is located. This is performed based on attributes of the item that is having its location assigned.

FIG. 4 also shows yet another embodiment making use of an in-store survey process 860 to provide actual physical location data. Whereas the planogram (POG) assigns a group of items to their planned location in the CAD floor plan, the In-store survey process 860 bypasses the planogram entirely by barcode-scanning (or other scanning) one or more items from a distinct mapped location, and then assigning each of those barcode-scanned to the distinct mapped location. With as few as one item scanned and assigned to a distinct mapped location, subsequent group matching 30 are then enabled to associate other similar items to the same location.

Figure 5:
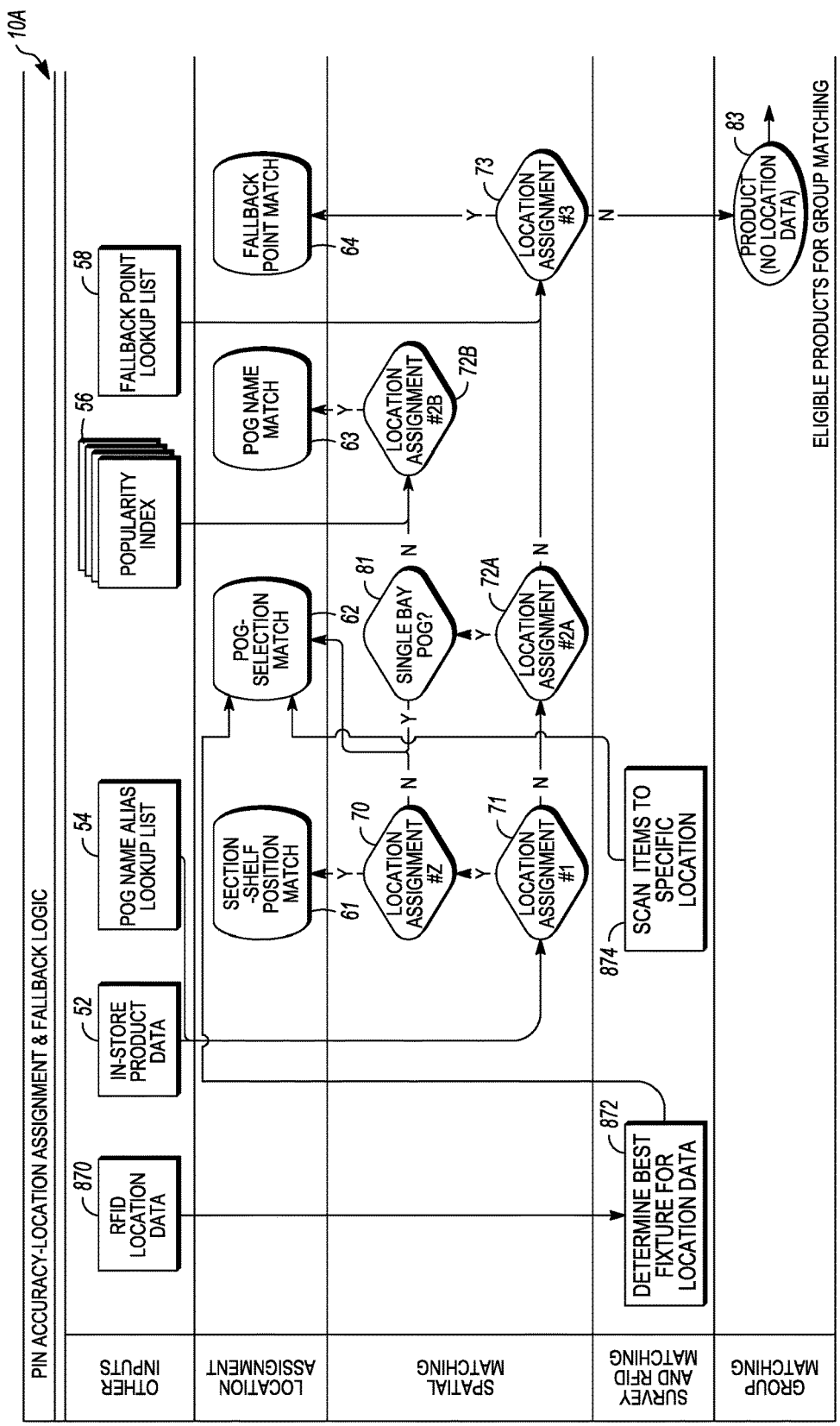
FIG. 5 shows specifically where the RFID location data, and/or physically barcode-scanned item locations, are input to the location assignment system, in accordance with the principles of the present invention.

FIG. 5 shows specifically where the RFID location data 870, and/or physically barcode-scanned item locations, are input to the location assignment system, in accordance with the principles of the present invention.

In particular, RFID location data 870 for certain items, e.g., items including an RFID tag within a store. Typical RFID reader systems utilize a grid of RFID receivers, e.g., mounted to the ceiling of the store. Each of the RFID readers has a known location, so certain proximity is known for items read by the RFID reader system. These identity and RFID location data 870 of these items are input to the location assignment system.

The RFID location data 870 is input to a "Determine best fixture for location data" process 872 to determine a best matching physical fixture given the input RFID location data 870. This process results in a planogram (POG) section matched location 62 assigned to the RFID located items.

Items are manually barcode-scanned and mapped to specific physical locations in process 874. This process results in a planogram (POG) section matched location 62 assigned to the scanned items.

FIG. 6 illustrates an exemplary product location assignment system including a product location assignment server 200 and a product location assignment database 300. In communication with the location assignment system are one or more merchant servers 115, and one or more wholesale supplier servers 160.

The product location assignment server 200 is in communication with a merchant 185B including a single venue 170C. The venue includes a point-of-sale system 180C that provides sale information relating to a catalog of items 181C. Mobile devices 105C may be used by customers at the POS terminals 180C to complete sale transactions of particular items 181C, with the highest number of sales of any given item providing a ranking for use in determination of a most popular item. The popularity may be determined daily, weekly, monthly, quarterly, annually, etc.

RFID or other location tracker devices 182C may be associated with some of the retailer's catalog items 181C.

FIG. 6 additionally depicts another merchant 185A having a plurality of venues 170A, 170B, exhibiting that the present invention relates to location assignment for item catalogs relating to retail merchants 185B with only a single venue 170C, as much as larger retail merchants having a plurality of venues 170A, 170B. Each venue 170A, 170B has its own CAD floor plan(s) 12.

The CAD floor plan 12 of some embodiments comprise a dimensioned x- and y-coordinate plan view diagram of a venue 170A, 170B. It will be appreciated that the CAD floor plan 12 includes text and other data.

The CAD floor plan(s) 12 in some embodiments divide the venues 170A, 170B in the y-coordinate by aisles, rows and the like, and may be associated with a size of the aisle, row, or the like (such as, for example, 7'-7"). The CAD floor plan(s) 12 of the venues 170A, 170B in these embodiments are divided in the x-coordinate by bay, section, shelving units, and the like. Some sections may occupy an entire row (a y-coordinate unit), or a portion of a row (an x-coordinate within a y-coordinate unit). The CAD floor plan(s) 12 of the venues 170A, 170B further comprise z-values for layers of shelves, shelf sections, or the like, and/or such z values may be represented by additional layers in CAD floor plan(s) 12.

Components of the CAD floor plan(s) 12 which describe the occupation of space such as rectangular units, areas, points, anchor points (which may indicate the starting point for measuring a distance), dimensions, identification of aisles, sections or bays and the like shall be referred to herein as "spatial units." The spatial units in the CAD floor plan(s) 12 may correspond to standard units, such as a 2' or 4' lengths, 2' by 4' rectangles, and the like or may have non-standard defined dimensions.

CAD floor plan(s) 12 may further comprise alpha-numeric text labels associated with the spatial units, referred to herein as "map labels." The map labels may recite section or bay names or numbers, aisle or row names or numbers, item category names, codes for items, types, groups or categories of items, dimensions in the CAD floor plan 12, and the like. The map labels may be within a unit, or may be proximate to a unit. The map labels may be associated with an anchor point and may indicate a corner of a spatial unit. Certain of the units may be non-standard and may be associated with "fallback" locations, areas, or points.

The association between the map labels and the spatial units is according to a file which is part of, accompanies, or is associated with the CAD floor plans 12, which is created with the creation of the CAD floor plans 12 or created after the fact, programmatically, and/or with human assistance.

Planograms 14 comprises groups of Items in, for example, a table, list, database, structured flat file, or similar. Planograms 14 may comprise columns or similar for entries corresponding to a store or venue identifier, such as a name or number, an identifier of a building, floor, or the like, one or more merchandizing group IDs (which may be or may, via a code, refer to a categorization or group of Items), item unique identifier(s) such as a SKU, UPC, or product name or number, a barcode or the like, and text or another character string meant to correspond with a spatial unit in a CAD floor plan 12 (such as an anchor point, or a section), and/or a value indicating how far along the aisle, row, shelf section, or other spatial unit the item(s) may be found. The merchandizing group IDs may be part of a hierarchical system, with n-parent/child merchandizing group IDs above/below a given merchandizing group ID. The merchandizing group IDs may refer to or be meant to correspond to physical locations in venues, such as to spatial units. An item unique identifier may occur in multiple rows (or equivalent) associating the item with multiple non-overlapping Merchandizing Group IDs. Two rows from an example Planogram 14 are provided in the following Table 1.

TABLE 1

| (optional) Store Number | (optional) Floor ID | Merchandizing Group ID 1 | (optional) Merchandizing Group ID 2 | SKU (unique identifier) | (optional) Distance in Merchandizing Group (in units from an anchor point) |
| --- | --- | --- | --- | --- | --- |
| 4 | AADF3A8E-DF75-4CBC-81EF-219D7827B83E | Appliances | Section 1 | 1487835 | 40 |
| 4 | AADF3A8E-DF75-4CBC-81EF-219D7827B83E | Appliances | Section 2 | 3487653 | 120 |

During cross-referencing of the CAD floor plan 12 with the planogram 14, certain of the entries in the planogram 14 may be found to correlate with the map labels in the CAD floor plan 12, such as a merchandizing group ID in the planogram 14 correlating with a map label in the CAD floor plan 12. Performance of this step may be aided by a table of synonyms, or similar, which may convert a code into text, a number, or the like (or visa versa).

In certain instances, the correlation may not be obtained, such as when a merchandizing group ID value in the planogram 14 cannot be found in the map labels in the CAD floor plan 12.

The result is saved as a place-planogram.

The planogram 14 and item catalog is cross-referenced to correlate items in the item catalog with items in the planogram 14, and saved as an item-planogram, which associates items and item unique identifiers in the item catalog with the locations of groups of items listed in the planogram 14.

A determination is made regarding whether the item is associated with a section or similar spatial unit with a place-planogram location match. This determination may identify exceptions, such as when the planogram 14 identifies that the item is located a distance from a corner of a section or other spatial unit, but the CAD floor plan 12 identifies that the section or other spatial unit is shorter than the distance from the corner. Other forms of exceptions may occur, which may also not result in a location match.

An error radius for the section may be set, and used to identify an uncertainty in the location assigned to an item. The error radius or perimeter is preferably relative to the determined location (or relative to a center of a determined location). The error radius may be a circular radius, a non-circular area such as a rectangular area within an aisle (as may fit within a circular radius, factoring in the shape of the venue and utilization of spatial units such as aisles), or the like.

A determination is made regarding whether the place-planogram location match identifies a shelf or other z-coordinate for the item, or if the place-planogram location match identifies a distance relative to the spatial unit. If affirmative, then the error radius may be re-determined. The determined location and error boundary may be assigned and recorded.

The "fallback" point lookup list 58 is a location identified in the planogram 14, CAD floor plan 12, and/or another data source which does not conform to standard units—such as sections, bays, or the like—but which may occur between or at the end of such units, such as a basket or stack of items in the middle of an aisle.

Tables 2 through 6, following, illustrate spatial location data and group matching information, as well as the processing of such information to determine error radii (discussed above) specific to a given venue.

Certain cells in Tables 2 through 6 contain an alphanumeric code, such as "A1," which may be used in other of the cells as a pointer to such cell. For example, A1 indicates that data must be input. Entries such as "A4=A2*A3," indicate that the cell is identified as "A4" and that the value of A4 is determined by multiplying A2 by A3.

Table 2 illustrates spatial data regarding a given venue which may be captured or input into or determined by the location assignment system.

TABLE 2

| Variables (per retailer) Spatial information (from CAD floor plan) | |
| --- | --- |
| Average Store size (sq ft): | A1 |
| Typical section width (ft): | A2 |
| Typical section depth (ft): | A3 |
| Average section size (sq ft): | A4 = A2 * A3 |
| Average # of sections: | A5 |
| Average # of sections/Planogram | A6 |
| Average # Planograms/Department: | A7 |
| Total Section Squ. Footage | A8 = A5 * A4 |
| Merchandizing SF %: | A9 = A8/A1 |

Table 3 illustrates group matching data which may be captured or input into or determined by the location assignment system.

TABLE 3

| Variables (per retailer) continued Group Matching (from planogram) | | | | |
| --- | --- | --- | --- | --- |
| Average # SKUs/store: | A10 | | | |
| Number of Categories/store: | A11 | Std Deviation | Highest Precision | Lowest Precision |
| Average # Items/Category: | A12 = A10/A11 | B1 | C1 = IF(B1 > A12, 0, Round (A12 − B1, −1) | D1 = Round(A12 + B1, −1) |
| Number of Parent Categories/store: | A13 | | | |
| Average # Item/Parent Category: | A14 = A10/A13 | B2 | C2 = IF(B2 > A14, 0, ROUND(A14 − B2, 0)) | D2 = ROUND(A14 + B2, −1) |
| Number of Departments: | A15 | | | |
| Average # Items/Department: | A16 = A10/A15 | B3 | C3 = IF(B3 > A16, 0, ROUND(A16 − | D3 = ROUND(A16 + B3, −2) |

TABLE 3-continued

Variables (per retailer) continued
Group Matching (from planogram)

B3, −2)

SKU Density         A17 =
(SKUs per SF):      A10/A1

Table 4 illustrates the accuracy of an assigned location for spatially matched items.

TABLE 4

Results (per retailer)

| Match Type | Location Assignment Type | Accuracy or Error Radius (sq ft) | Accuracy or Error Radius (radial ft) |
|---|---|---|---|
| Spatial | Planogram-Section Match | C4 = A4 | D4 = SQRT(C4/pi) |
| Spatial | Planogram Name Match | C5 = (C4 * A6) * (1/A9) | D5 = SQRT(C5/pi) |
| Spatial | Fallback Point Match | C6 = 4 * C5 | D6 = SQRT(C6/pi) |
| Spatial | Department Name Match | C7 = C6 * A7 | D7 = SQRT(C7/pi) |

Table 5 illustrates the accuracy of an assigned location for group matched items.

TABLE 5

Results (per retailer)

| Match Type | Location Assignment Type | Accuracy or Error Radius (SKU likelines) | Accuracy or Error Radius (radial ft) |
|---|---|---|---|
| /Group | Most Popular match in Category | C8 = CONCAT(ROUND(A10 * A18, 0), "to", ROUND(A10 * C18, 0), "SKUs") | D8 = SQRT(((A10 * C18)/(A17))/pi)) |
| Group | Most Popular match in Parent Category | C9 = CONCAT(ROUND(A10 * A19, 0), "to", ROUND(A10 * C19, 0), "SKUs") | D9 = SQRT(((A10 * C19)/(A17))/pi)) |
| Group | Most popular Product in Department | C10 = CONCAT(ROUND(A10 * A20, 0), "to", ROUND(A10 * C20, 0), "SKUs") | D10 = SQRT(((A10 * C20)/(A17))/pi)) |
| Group | Most Popular Product in Store | C11 = CONCAT(ROUND((A10) * C21, 0), "SKUs") | D11 = SQRT(((A10 * C21)/(A17))/pi)) |

Table 6 illustrates results of processing data by the location assignment system relative to a retailer or merchant, with results which are used in Table 5.

TABLE 6

Results (per retailer), continued
Accuracy Range (% of total store sq ft)

| Location Assignment Type | Highest Precision | Average Precision | Lowest Precision |
|---|---|---|---|
| Popular match in Category | A18 = B1/A10 | B18 | C18 = D1/A10 |
| Popular Match in | A19 = | B19 | C19 = |

TABLE 6-continued

Results (per retailer), continued
Accuracy Range (% of total store sq ft)

| Location Assignment Type | Highest Precision | Average Precision | Lowest Precision |
|---|---|---|---|
| Parent Category | B2/A10 | | D2/A10 |
| Most popular product in department | A20 = B3/A10 | B20 | C20 = D3/A10 |
| Most popular Product in store | n/a | n/a | C21 = 1.0 |

Alternatively, if an item is not present in a planogram for a given venue 170A, the location assignment process 10 may determine an item proxy location by examining instances of items in planograms 14 at other venues 170B of the retail merchant.

Optionally planogram(s) 14 for other venues 170B associated with a given retail merchant which contain the item may be sorted using a planogram identifier, forming groups of planograms.

Planograms 14 may be weighted. In assigning location, the planogram groups may be ranked according to which of such planograms have the same category, or the same parent category, thus being weighted more for assignment of the item. A determination is made regarding whether the planogram, or the top-ranked planogram is found in (or associated with) the present venue 170A.

Referring back to FIG. 6, blocks enclosing merchant 185B with a single venue 170C, or merchant 185A having multiple venues 170A, 170B, are logical blocks, not necessarily indicating physical boundaries. Venues 170A, 170B may be buildings, such as stores comprising merchandise items for sale, at multiple distinct geographic locations. POS computers 180A, 180B may be, for example, a computer in, controlling, or in communication with a cash register or equivalent device in a corresponding venue 170A, 170B. Mobile devices 105A, 105B, 105C may be, for example, mobile phones, smart phones, tablet computers, laptop computers, or the like. Merchant server 115 and wholesale supplier server 160 may be, for example, computers utilized by merchants and suppliers to merchants.

Product items 181A, 181B, 181C in a retailer's catalog may be, for example, one or more merchandise items for sale in a given venue. A set of one or more merchandise items may be represented by each of Item 181A, 181B, 181C. Items may be dispersed throughout a venue. One or more of such items may or may not comprise a wireless transponder, such as an RFID tag. RFID tags may be active (which may contain a battery to actively transmit) or passive (which passively reflect or emit a signal in response to an interrogation signal).

Item location trackers 182A, 182B, 182C may be, for example, one or more receivers of a wireless signal. A set of item location trackers may be represented by each of item location tracker 182A, 182B, 182C. An item location tracker may be placed to sense occurrence of a wireless signal in an area (such as by a beacon in a ceiling to receive signal from RFID tags within range). Multiple item location trackers may be placed in a venue to sense, bilaterate, trilaterate, or multi-laterate a location of an emitter of the wireless signal. For example, multiple Item location trackers may multilaterate a location of a wireless signal according to a received signal, a received signal strength, and/or received signal strength along a vector or direction. For example, item location tracker(s) 182A may receive a wireless signal from an RFID tag in an item. The wireless signal from the RFID tag may emit a wireless signal encoded with an identifier.

Item location trackers 182A may augment presence information with power level and/or vector or direction (as may be the case with item location trackers including a directional antenna). Based on known locations for individual item location trackers 182A and based on the power level and/or vector or direction of the signal, the location of the RFID tag in the Item 181A may be determined by multilateration.

The identifier may be looked up in a database record, such as one provided by or accessed at a merchant, a wholesale provider, etc., to determine an association between the identifier and an item. Alternatively, database records associating items with RFID identifiers may be created by the merchant. For example, the merchant may receive an item containing an RFID tag. The merchant may scan the RFID tag and obtain a unique identifier; the identifier may be arbitrary from the perspective of the merchant. The merchant may associate the unique identifier with one or more records associated with the item which the merchant may have or use. The product location assignment server 200 may obtain such records from the merchant or may create corresponding records for use by the product location assignment server 200.

Connection to the network 150 shown in FIG. 6, or direct connection between computing devices, may require that the computers execute software routines which enable, for example, the seven layers of the Open System Interconnection (OSI) model of computer networking or equivalent in a wireless phone or wireless data network. The network 150 comprises computers, network connections among the computers, and software routines to enable communication between the computers over the network connections. The network 150 may comprise, for example, an Ethernet network and/or the Internet. Communication among the various computers and routines may utilize various data transmission standards and protocols such as, for example, the application protocol HTTP. Transmitted data may encode documents, files, and data in various formats such as, for example, HTML, XML, flat files, and JSON.

While components may be discussed herein as connecting to the product location assignment server 200 or to the product location assignment database 300, it should be understood that such connections may be to, through, or via the other of the two components. References herein to "database" should be understood as equivalent to "datastore". The merchant server 115, the wholesale supplier server 160, the POS terminal computer 180, and the mobile devices 105 may comprise a database. Although illustrated in these Figures as components integrated in one physical unit, the computers, servers and databases may be provided by common (or separate) physical hardware and common (or separate) logic processors and memory components.

Figure 7:
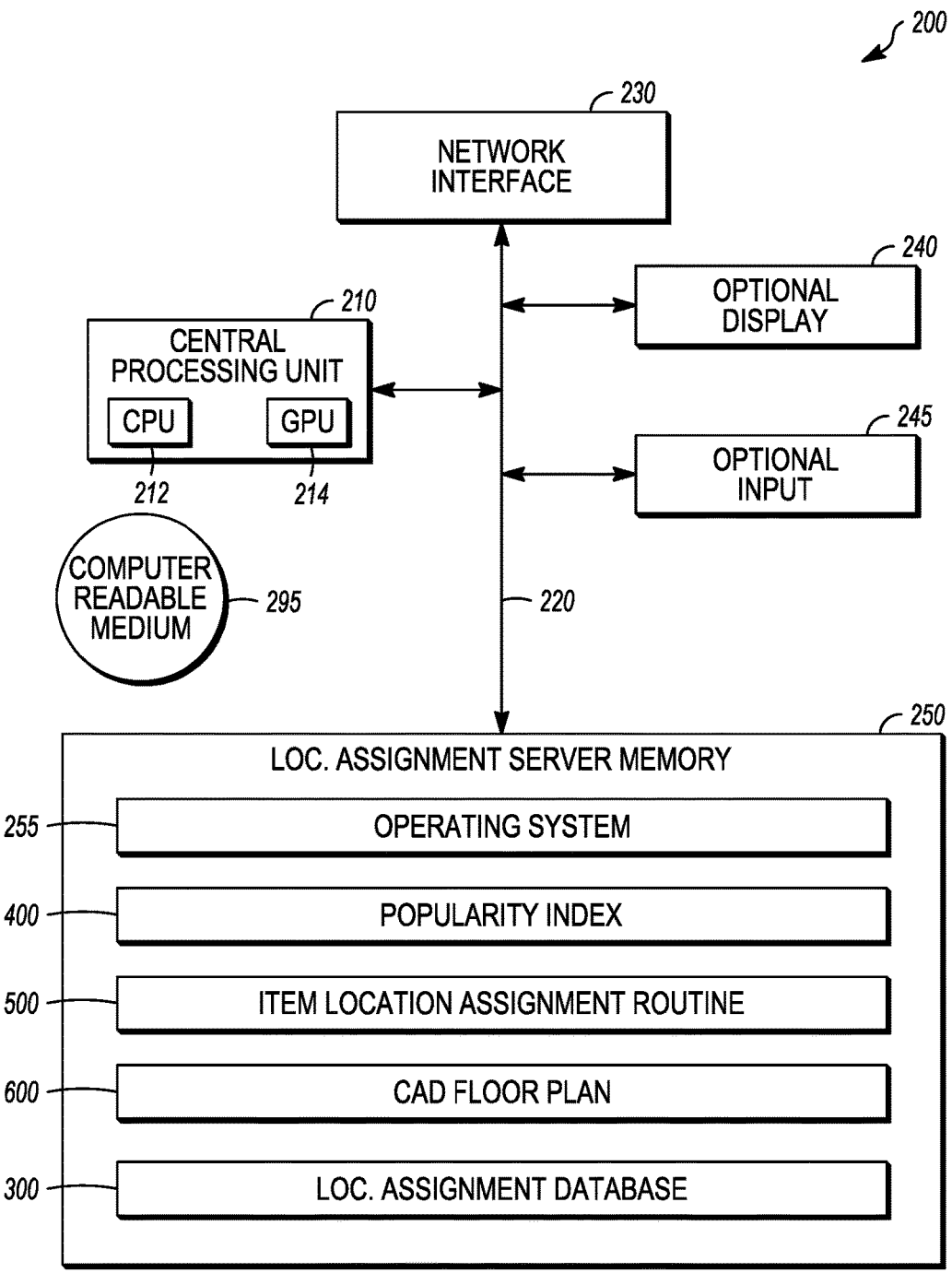
FIG. 7 shows an exemplary product location assignment server, in accordance with the principles of the present invention.

FIG. 7 is a functional block diagram of an exemplary product location assignment server 200 computing device and some data structures and/or components thereof. The computing device 200 comprises at least one processing unit 210, product location assignment server memory 250, and an optional display 240, all interconnected along with a network interface 230 via a bus 220. The network interface 230 may be utilized to form connections with the network 150 and to send and receive radio frequency ("RF") and other wireless and wireline signals.

The product location assignment server memory 250 generally comprises a random access memory ("RAM"), a read only memory ("ROM"), and a permanent mass storage device, such as a disk drive or SDRAM (synchronous dynamic random-access memory). The product location assignment server memory 250 stores program code for software routines, as well as browser, webserver, email client and server routines, camera, other client applications, and database applications. In addition, Product location assignment server memory 250 also stores an operating system 255. These software components may be loaded from non-transient computer readable storage medium 295 into the product location assignment server memory 250 of the computing device using a drive mechanism (not shown) associated with a non-transient computer readable storage medium 295, such as a DVD/CD-ROM drive, memory card, or other non-volatile storage medium. In some embodiments, software components may also or instead be loaded via a mechanism other than a drive mechanism and a computer readable storage medium 295, e.g., via the network interface 230.

The computing device 200 may also comprise hardware supported input modalities, input 245, such as, for example, a touchscreen, a keyboard, a mouse, a trackball, a stylus, a microphone, accelerometer(s), compass(es), RF receivers (to the extent not part of the network interface 230, and a camera, all in conjunction with corresponding routines.

Figure 8:
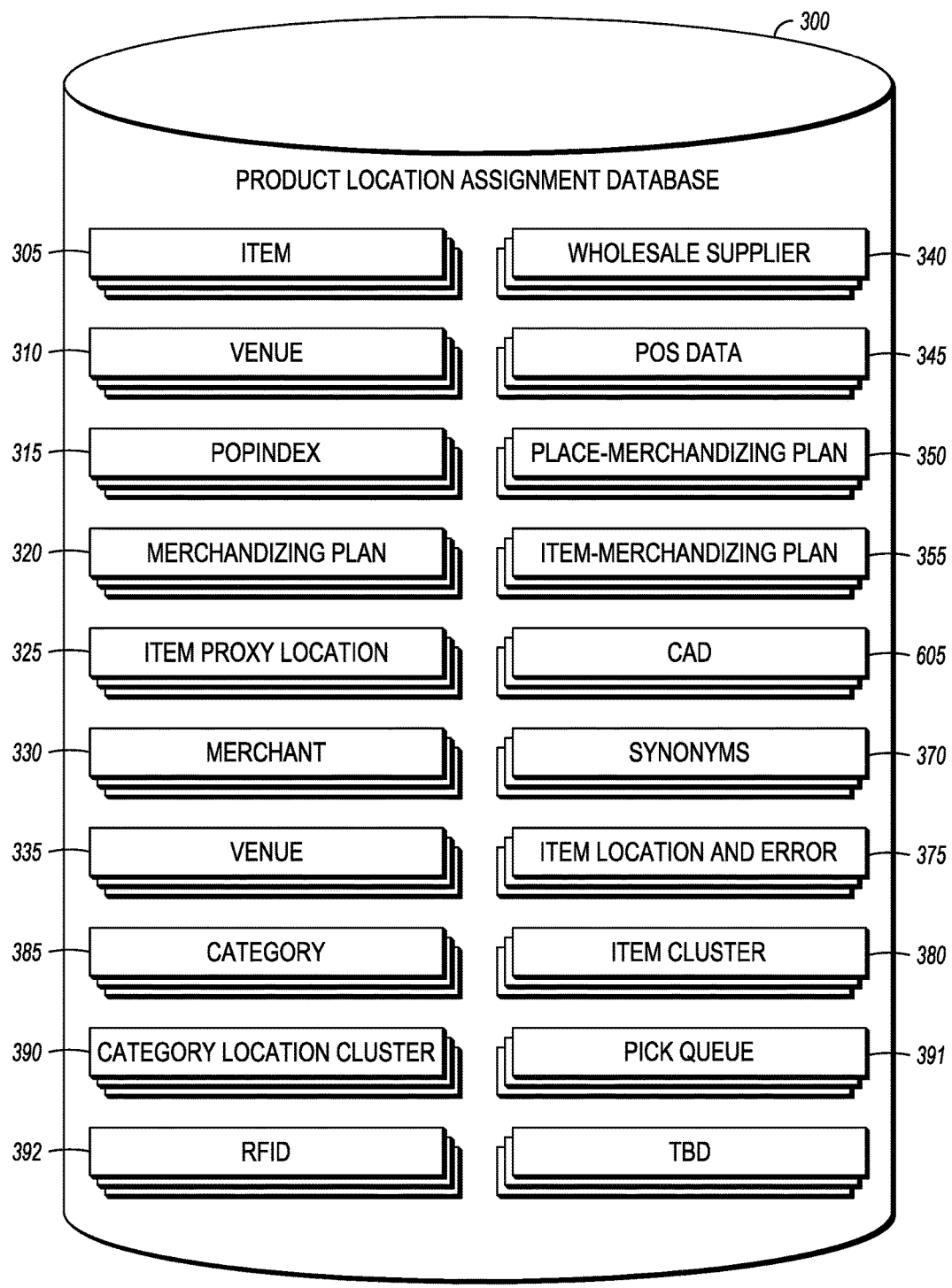
FIG. 8 shows an exemplary product location database in more detail.

Product location assignment server 200 may also comprise or communicate via the bus 220 with the product location assignment server database 300, illustrated further in FIG. 8. In various embodiments, the bus 220 may comprise a storage area network ("SAN"), a high speed serial bus, and/or via other suitable communication technology. In some embodiments, the product location assignment server 200 may communicate with the product location assignment server database 300 via the network interface 230. The product location assignment server 200 may, in some embodiments, include many more components than those shown.

The product location assignment server 200 is illustrated in FIG. 7 as comprising data groups for routines, which are discussed at greater length herein. Additional data groups for the routines, such as for a webserver and web browser, may also be present on and executed by the product location assignment server 200. Webserver and browser routines may provide an interface for interacting with the other computing devices illustrated in FIG. 6, such as with the merchant server 115, the wholesale supplier server 160, the mobile device 105, and the location tracker 182 (all which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

FIG. 8 is a functional block diagram of Product location assignment database 300.

Data groups for routines and data groups used by routines. In addition to the data groups explicitly illustrated, additional data groups may also be present on and/or executed by this device, such as routines for databases, webservers, and web browsers, and routines to enable communication with other computers. The data groups used by routines may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar. The browser routines may provide an interface for interacting with other computers through, for example, a webserver routine (which may serve data and information in the form of webpages). The web browsers and webservers are meant to illustrate or refer to user-interface and user-interface enabling routines generally, and may be replaced by equivalent routines for serving and rendering information to and in a user or device interface. Log-in credentials and local instances of user or device profiles may be stored in or be accessible to the mobile device 105, the product location assignment server 200, the merchant server 115, the wholesale supplier server 160, the location trackers 182, and the POS terminal computers 180. Such user or device profiles may be utilized to provide secure communication between the computers.

The software routines and data groups used by the software routines may be stored and/or executed remotely relative to any of the computers through, for example, application virtualization.

The components of the product location assignment database 300 are data groups used by routines and are discussed further herein. Though referred to herein as individual records or entries, the records may comprise more than one database entry. The database entries may be, represent, or encode numbers, numerical operators, binary values, logical values, text, string operators, joins, conditional logic, tests, and similar. In addition to the data groups used by routines illustrated in FIG. 8, log-in credentials and local instances of customer and user profiles may be stored in or be accessible to all of the computing devices illustrated in FIG. 6.

Figure 9:
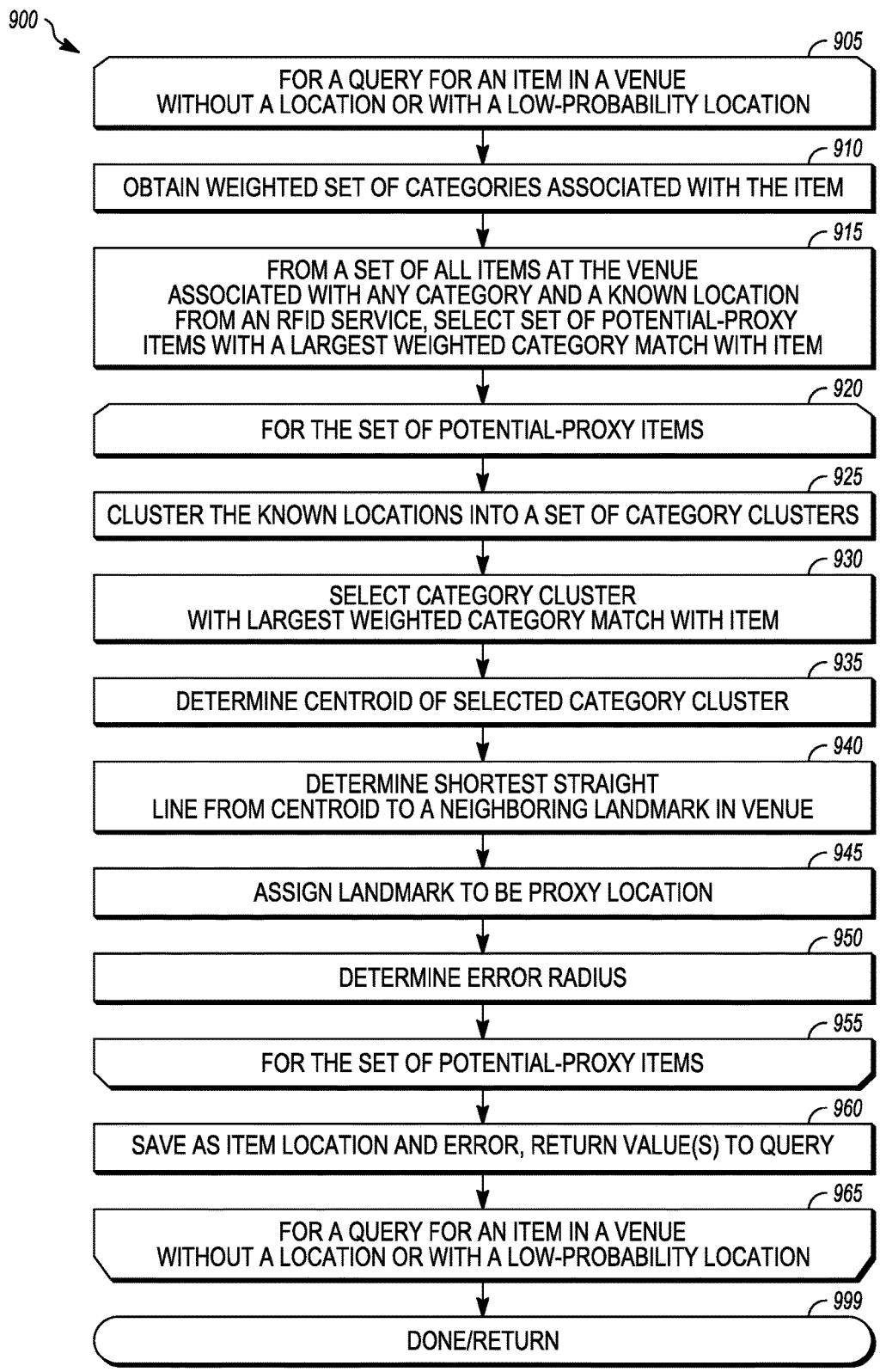
FIG. 9 illustrates a third alternative item inferred location assignment routine to infer a location of a product, in accordance with the principles of the present invention.

FIG. 9 illustrates an alternative embodiment of a location assignment routine 900. The location assignment routine 900 may be executed by, for example, on the product location assignment server 200.

The alternative embodiment of a location assignment routine 900 is executed when an input catalog item is identified as not having a location in a planogram, and/or if the item is a type of good, such as a apparel, which is known to have an imprecise or frequently inaccurate location in a planogram, and/or if the item has an item proxy location or item location and error record with a precision below a threshold.

Opening loop block 905 to closing loop block 965 may iterate over queries for items in a venue, wherein the corresponding item is not associated with a location in a planogram, and/or if the item has a low-probability of being at an assigned location.

At block 910, the location assignment routine 900 obtains a weighted set of categories associated with the item. For example, one or more categories or parent-categories in a category schema may be obtained from item category records. If the categories or parent-categories are not already weighted, they may be weighted at block 910 according to a level in a category schema which organizes the category records or according to another weighting system. For example, weighting may weigh categories more heavily the closer the category is to a leaf-node category for the item. For example, if an item has a category record(s) comprising, "mens/clothing/shoes/running shoes/Nike/Air-Jordan", the "running shoes" level of the category schema may be weighted more heavily than the "shoe" or "clothing" levels of the category schema. Alternatively and/or in addition, the category schema weighting may be customized for particular merchants or venues. For example, one merchant or venue may place all men's' clothing on floor A and all women's clothing on floor B, in which case, the category schema may look like, "clothing/mens/shoes/running shoes/Nike/Air-Jordan" to weight the "mens" level of the category schema more heavily than the "clothing" level.

At block 915, the location assignment routine 900 selects a set of potential-proxy items with a largest weighted category match with the item from a set of all Items at the venue of the item (referred to herein as "comparison Items"), which set comprises all comparison Items associated with any category and associated with a known location. The "known location" may be based, for example, on whether such item has a location obtained from an RFID tag and/or location tracker 182, based on a manually scanned and determined location (such as by employees scanning item barcodes while the location of the scanning device is tracked or known), based on a planogram and/or a place-planogram and/or an item-planogram, and/or based on an item location and Error record with a low degree of error, and/or based on other means to determine the location of such comparison Item with a high degree of confidence.

Opening loop block 920 to closing loop block 955 may iterate over items in the set of potential-proxy items and the item.

At block 925, the location assignment routine 900 clusters the known locations of the items in the set of potential-proxy items of block 915 into location-based clusters. The location-based clusters may be stored as one or more category location cluster records.

At block 930, the location assignment routine 900 selects a category location cluster with a largest combined, average, or median weighted category match with item.

At block 935, the location assignment routine 900 determines a centroid of the selected category location cluster of block 930.

At block 940, the location assignment routine 900 determines a closest neighboring landmark in the venue to the determined centroid. Determination of the closest neighboring landmark may take into account paths which can be traversed by people, for example a path which requires going through a shelf (not along a path which can be traversed by a person) may not be considered. Landmarks may include, for example, an end cap, a display rack, a shelf, and a checkout station.

At block 945, the location assignment routine 900 assigns the landmark selected at block 940 to be an item proxy location for the item.

At block 950, the location assignment routine 900 determines an error radius or error factor for the item proxy location. The error radius may be determined based on, for example a level or value of an average or median largest weighted category match of category location cluster in the hierarchy of weighted categories in the category schema, whether a source of the known locations of potential-proxy items in the category location cluster is from an RFID tag and/or location tracker 182, from a manually scanned and determined location, from a planogram and/or a place-planogram and/or an item-planogram, and/or based on an item location and error record with and based on the degree of error in such record, and the like.

At block 960, the location assignment routine 900 saves the determined proxy location and error as, for example, one or more item location and error records (including updating an existing record for such item) and may return values in such record to the query for the location of the item.

At block 999, the location assignment routine 900 concludes and/or returns to a process which called it.

Figure 10:
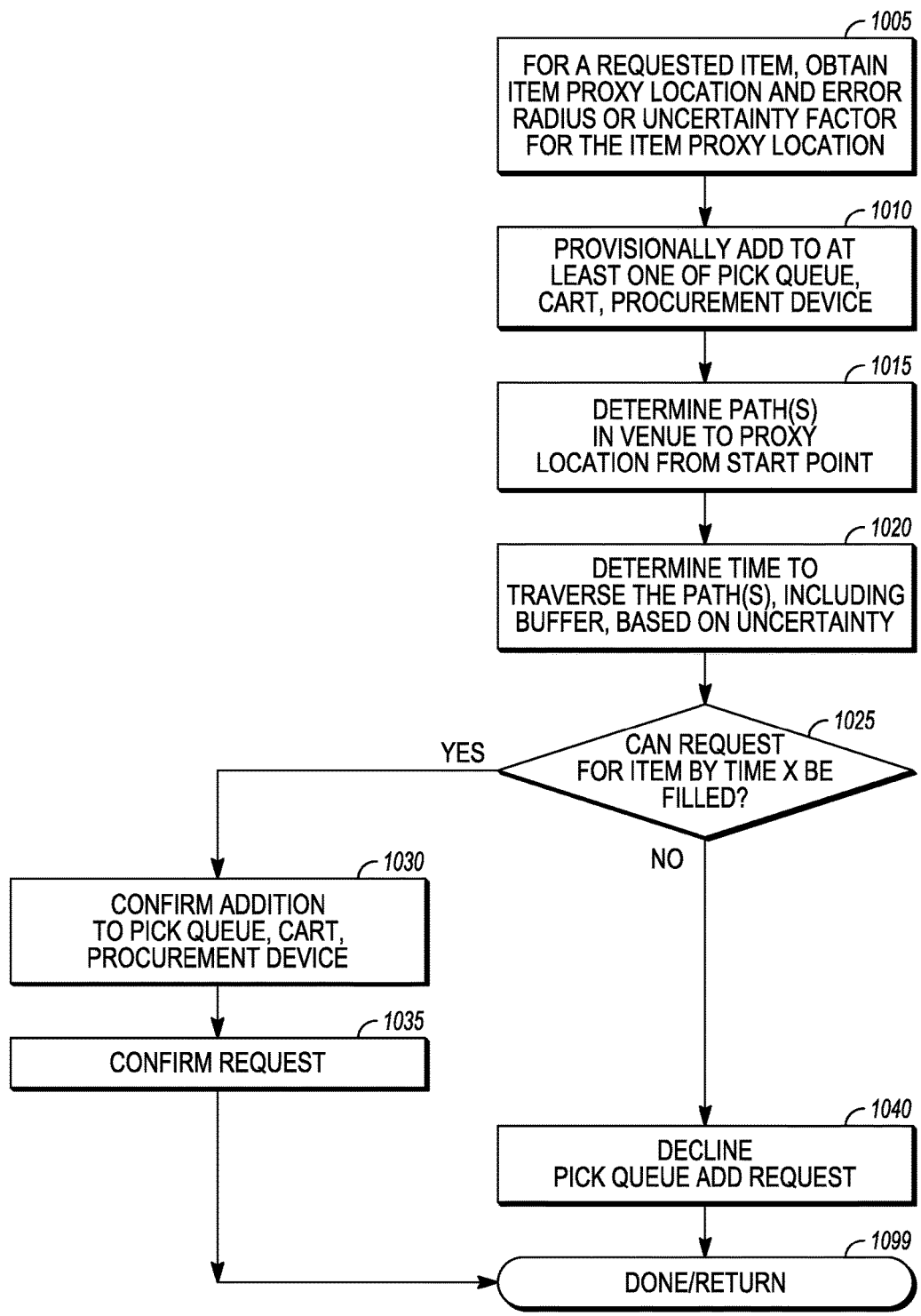
FIG. 10 illustrates an exemplary path and traversal time routine, in accordance with the principles of the present invention.

FIG. 10 illustrates an embodiment of a path and traversal time routine 1000, for use by the location assignment routine 900 shown in FIG. 9.

The path and traversal time routine 1000 is executed by the product location assignment server 200, to determine path(s) to an item proxy location in the venue for Item(s) and times to traverse the path(s), including time and path(s) based on an error radius or uncertainty.

Path and traversal time routine 1000 obtains an error radius or uncertainty factor for a proxy location. The error radius may be set as described in relation to the location assignment routine 900.

The path and traversal time routine 1000 may provisionally add a request for the item to a pick queue, determine path(s) to the item proxy location in the venue and times to traverse the path(s), including a buffer, based on the error radius or uncertainty. The path and traversal time routine 1000 determines whether a request for the item may be fulfilled by a requested time. If the request may be fulfilled in the requested time, the path and traversal time routine 1000 confirms the provisional addition of the item to the pick queue or, if the request may not be fulfilled in time, the request may be declined.

In this way, the location assignment routine 900 is able to determine a proxy location for an item, making use of partial data from an incomplete set of RFID tags. The location assignment routine 900, and path and traversal time routine 1000 determine a valuable and actionable response to a query for location, in a context characterized by definite information regarding some items, but incomplete or entirely missing information regarding other items.

The path and traversal time routine 1000 provisionally adds a request for the item to a pick queue and determines a time to obtain the item, based on the status of the pick queue and the error radius or uncertainty. The path and traversal time routine 1000 determines whether a request for the item may be fulfilled by a requested time. If the request may be fulfilled in the requested time, the path and traversal time routine 1000 confirms the provisional addition of the item to the pick queue or, if the request may not be fulfilled in time, the request may be declined.

For example, at block 1005, the path and traversal time routine 1000 obtains an item proxy location and error radius or uncertainty factor for an item, such as from an item location and error record.

At block 1010, the path and traversal time routine 1000 may provisionally add item and item proxy location to at least one of a pick queue and/or a cart or procurement device to obtain item(s), such as in a pick queue.

At block 1015, the path and traversal time routine 1000 may determine one or more path(s) in the venue to the item proxy location, such as from a starting point. The starting point may be a default starting point, such as a pick queue starting point, from a location of a human or robotic Item procurement operative, or the like. The path may be a shortest path, a shortest path with the cart or procurement device, a shortest path to obtain a set of Items with a cart or procurement device, or the like.

At block 1020, the path and traversal time routine 1000 determines a time to traverse the path(s), including a time which includes a buffer based on the error radius and/or uncertainty factor, from the start point. The time may be based on average speed of the human or robotic item procurement operative, or the like.

At decision block 1025, the path and traversal time routine 1000 determines whether a request for an item be fulfilled within a time period, based on the time of block 1020. The time period may be a time period to an expected or desired delivery date/date.

If affirmative or equivalent at block 1025, at block 1030 the path and traversal time routine 1000 confirms addition of the item to the pick queue, cart, or procurement device of block 1010. At block 1035, the path and traversal time routine 1000 confirms the request for the item.

If negative or equivalent at decision block 1025, the path and traversal time routine 1000 declines the request of block 1005.

At done block 1099, the path and traversal time routine 1000 concludes and/or returns to a process which called it.

In this way, the location assignment routine 900 determines a proxy location for an item, making use of partial data from an incomplete set of RFID tags. This may create an incentive or reason to invest in the time and expense of operating location tracker(s) 182 in a venue and/or this may obtain additional value from sunk costs of location tracker(s) 182 in a venue. In this way, the location assignment routine 900 and the path and traversal time routine 1000 determine a valuable and actionable response to a location query in a context characterized by definite information regarding some items, but incomplete or entirely missing information regarding other items.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

Unless the context clearly requires otherwise, throughout the description and the claims, References are made herein to routines, subroutines, and modules; generally, it should be understood that a routine is a software program executed by computer hardware and that a subroutine is a software program executed within another routine. However, routines discussed herein may be executed within another routine and subroutines may be executed independently (routines may be subroutines and visa versa). As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs or routines having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single computer, processor or controller node or distributed among a plurality of computer, processor or controller nodes running in parallel, concurrently, sequentially or a combination.

While the invention has been described with reference to the exemplary embodiments thereof, those skilled in the art will be able to make various modifications to the described embodiments of the invention without departing from the true spirit and scope of the invention.

What is claimed is:

1. A method of building a product location assignment database for use by a location assignment system, the method comprising:
   associating a physical location to fixtures in at least one venue;
   receiving as input a unique identifier associated with each of a plurality of items in a catalog;
   spatially matching a sub-plurality of the plurality of items in the catalog to a physical location in the at least one venue, forming spatially matched items;
   storing the spatially matched items in a product location assignment database;
   assigning, for each non-spatially matched item from among the plurality of items in the catalog, a physical location in the at least one venue based on a most popular purchased item in a given group of the spatially matched items, and
   storing, in the product location assignment database, the non-spatially matched items as group matched items together with an assigned location;
   wherein the given group of the spatially matched items are grouped based on a commonality of at least one product attribute associated with each of the spatially matched items.

2. The method of building a product location assignment database for use by a location assignment system according to claim 1, wherein:
   the at least one product attribute associated with each of the spatially matched items includes a brand of the spatially matched items.

3. The method of building a product location assignment database for use by a location assignment system according to claim 1, wherein:
   the product location assignment database includes at least one product attribute of each of the plurality of items stored therein.

4. The method of building a product location assignment database for use by a location assignment system according to claim 1, wherein:
   the given group of spatially matched items is grouped based on a common brand attribute associated with each of the plurality of items.

5. The method of building a product location assignment database for use by a location assignment system according to claim 1, wherein:
   the given group of spatially matched items is grouped based on a common price attribute associated with each of the plurality of items.

6. The method of building a product location assignment database for use by a location assignment system according to claim 1, wherein:
   the given group of spatially matched items is grouped based on a common size attribute associated with each of the plurality of items.

7. The method of building a product location assignment database for use by a location assignment system according to claim 1, wherein the associating the physical location to fixtures in at least one venue comprises:
   matching naming data for at least one planogram to a fixture in at least one CAD floor plan for the at least one venue.

8. A method of building a product location assignment database using RFID tag detection, for use by a location assignment system, the method comprising:
   associating a physical location to fixtures in at least one venue;
   receiving as input a unique identifier associated with each of a plurality of items in a catalog;
   spatially matching, by a location assignment system operating on a processor, a sub-plurality of the plurality of items in the catalog to a physical location in the at least one venue, based at least in part on a detection of an RFID tag attached to the respective spatially matched items, to generate spatially matched RFID items;
   storing the spatially matched RFID items in a product location assignment database;
   assigning, for each non-spatially matched item in the catalog, a physical location in the at least one venue based on a most popular purchased item in a given group of the spatially matched RFID items, and
   storing, in the product location assignment database, the non-spatially matched items as group matched items with an assigned location;
   wherein the given group of the spatially matched RFID items are grouped based on a commonality of at least one product attribute associated with each of the spatially matched items.

9. The method of building a product location assignment database using RFID tag detection, for use by a location assignment system according to claim 8, further comprising:
spatially matching the spatially matched RFID items further based on a planogram associated with the at least one venue.

10. The method of building a product location assignment database using RFID tag detection, for use by a location assignment system according to claim 8, wherein:
the at least one product attribute associated with each of the spatially matched RFID items includes a brand of the spatially matched items.

11. The method of building a product location assignment database using RFID tag detection, for use by a location assignment system according to claim 8, wherein:
the product location assignment database includes at least one product attribute associated with each of the plurality of items stored therein.

12. The method of building a product location assignment database using RFID tag detection, for use by a location assignment system according to claim 8, wherein:
the given group of spatially matched RFID items is grouped based on a common brand attribute associated with each of the plurality of items.

13. The method of building a product location assignment database using RFID tag detection, for use by a location assignment system according to claim 8, wherein:
the given group of spatially matched RFID items is grouped based on a common price attribute associated with each of the plurality of items.

14. The method of building a product location assignment database using RFID tag detection, for use by a location assignment system according to claim 8, wherein:
the given group of spatially matched RFID items is grouped based on a common size attribute associated with each of the plurality of items.

15. A location assignment system for building a product location assignment database, comprising:
means for associating a physical location to fixtures in at least one venue;
means for receiving as input a unique identifier associated with each of a plurality of items in a catalog;
means for spatially matching a sub-plurality of the plurality of items in the catalog to a physical location in the at least one venue, forming spatially matched items;
means for storing the spatially matched items in a product location assignment database;
means for assigning, for each non-spatially matched item from among the plurality of items in the catalog, a physical location in the at least one venue based on a most popular purchased item in a given group of the spatially matched items, and
means for storing the non-spatially matched items as group matched items together with an assigned location;
wherein the given group of the spatially matched items are grouped based on a commonality of at least one product attribute associated with each of the spatially matched items.

16. The location assignment system for building a product location assignment database according to claim 15, wherein:
the at least one product attribute of the grouped associated with each of the spatially matched items includes a brand of the spatially matched items.

17. The location assignment system for building a product location assignment database according to claim 15, wherein:
the product location assignment database includes at least one product attribute of each of the plurality of items stored therein.

18. The location assignment system for building a product location assignment database according to claim 15, wherein:
the given group of spatially matched items is grouped based on a common brand attribute associated with each of the plurality of items.

19. The location assignment system for building a product location assignment database according to claim 15, wherein:
the given group of spatially matched items is grouped based on a common price attribute associated with each of the plurality of items.

20. The location assignment system for building a product location assignment database according to claim 15, wherein:
the given group of spatially matched items is grouped based on a common size attribute associated with each of the plurality of items.

21. The location assignment system for building a product location assignment database according to claim 15, wherein the associating the physical location to fixtures in at least one venue comprises:
means for matching naming data for at least one planogram to a fixture in at least one CAD floor plan for the at least one venue.

* * * * *